US007245925B2

(12) United States Patent
Zellner

(10) Patent No.: US 7,245,925 B2
(45) Date of Patent: Jul. 17, 2007

(54) SYSTEM AND METHOD FOR USING LOCATION INFORMATION TO EXECUTE AN ACTION

(75) Inventor: Samuel N. Zellner, Dunwoody, GA (US)

(73) Assignee: AT&T Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 11/300,694

(22) Filed: Dec. 15, 2005

(65) Prior Publication Data

US 2006/0094447 A1    May 4, 2006

Related U.S. Application Data

(63) Continuation-in-part of application No. 09/739,340, filed on Dec. 19, 2000, now Pat. No. 7,116,977.

(51) Int. Cl.
*H04Q 7/20* (2006.01)

(52) U.S. Cl. ................................. 455/456.1
(58) Field of Classification Search ............ 455/456.2, 455/456.1
See application file for complete search history.

(56) References Cited

U.S. PATENT DOCUMENTS

| 4,445,118 | A | 4/1984 | Taylor et al. .......... 342/357.09 |
|---|---|---|---|
| 4,757,267 | A | 7/1988 | Riskin ........................ 379/113 |
| 5,303,393 | A | 4/1994 | Noreen et al. ............... 455/3.2 |
| 5,511,111 | A | 4/1996 | Serbetcioglu et al. ......... 379/67 |
| 5,512,908 | A | 4/1996 | Herrick ..................... 342/387 |
| 5,528,248 | A | 6/1996 | Steiner et al. ......... 342/357.06 |
| 5,588,042 | A | 12/1996 | Comer ........................ 379/59 |
| 5,596,625 | A | 1/1997 | LeBlanc ...................... 379/60 |
| 5,610,973 | A | 3/1997 | Comer ........................ 379/59 |
| 5,625,364 | A | 4/1997 | Herrick et al. .............. 342/449 |
| 5,663,734 | A | 9/1997 | Krasner ..................... 342/357 |
| 5,694,453 | A | 12/1997 | Fuller et al. ........... 340/825.49 |
| 5,701,301 | A | 12/1997 | Weisser, Jr. ................. 370/428 |
| 5,712,899 | A | 1/1998 | Pace, II ...................... 379/58 |
| 5,727,057 | A | 3/1998 | Emery et al. ............... 379/211 |
| 5,771,283 | A | 6/1998 | Chang et al. ............... 379/142 |
| 5,794,210 | A | 8/1998 | Goldhaber et al. ........... 705/14 |

(Continued)

FOREIGN PATENT DOCUMENTS

EP         000964542 A2    12/1999    ............... 705/14 X (Continued)

OTHER PUBLICATIONS

U.S. Official Action dated Dec. 13, 2005 cited in U.S. Appl. No. 09/740,372.

(Continued)

*Primary Examiner*—William D. Cumming
(74) *Attorney, Agent, or Firm*—Merchant & Gould

(57) ABSTRACT

Provided are methods for executing an action in response to a request for a service using location information in conjunction with service-specific parameters. A user may request a provider of a specified service (e.g., taxi, plumber, pharmacist, etc.). In evaluating the request, providers may be evaluated based on the location information in addition to service-specific parameters. An action in response may include merely displaying selected service provider(s) in response to the request, or acting on behalf of the user by communicating with a selected service provider.

18 Claims, 10 Drawing Sheets

U.S. PATENT DOCUMENTS

| | | | | |
|---|---|---|---|---|
| 5,819,155 | A | 10/1998 | Worthy et al. | 455/2 |
| 5,838,774 | A | 11/1998 | Weisser, Jr. | 379/92.02 |
| 5,852,775 | A | 12/1998 | Hidary | 455/412.1 |
| 5,875,401 | A | 2/1999 | Rochkind | 455/466 |
| 5,961,593 | A | 10/1999 | Gabber et al. | 709/219 |
| 6,028,921 | A | 2/2000 | Malik et al. | 379/201 |
| 6,047,327 | A | 4/2000 | Tso et al. | 709/232 |
| 6,085,086 | A | 7/2000 | LaPorta et al. | 455/432 |
| 6,091,956 | A | 7/2000 | Hollenberg | 455/456.5 |
| 6,101,381 | A | 8/2000 | Tajima et al. | 455/414 |
| 6,112,186 | A | 8/2000 | Bergh et al. | 705/10 |
| 6,122,520 | A | 9/2000 | Want et al. | 455/456.2 |
| 6,133,853 | A | 10/2000 | Obradovich et al. | 340/905 |
| 6,138,003 | A | 10/2000 | Kingdon et al. | 455/410 |
| 6,157,829 | A | 12/2000 | Grube et al. | 455/414 |
| 6,184,829 | B1 | 2/2001 | Stilp | 342/387 |
| 6,185,426 | B1 | 2/2001 | Alperovich et al. | 455/456 |
| 6,208,866 | B1 | 3/2001 | Rouhollahzadeh et al. | 455/456.5 |
| 6,229,477 | B1 | 5/2001 | Chang et al. | 342/357.01 |
| 6,233,329 | B1 | 5/2001 | Urban et al. | 379/142.1 |
| 6,259,405 | B1 | 7/2001 | Stewart et al. | 342/457 |
| 6,311,069 | B1 | 10/2001 | Havinis et al. | 455/456.4 |
| 6,317,718 | B1 | 11/2001 | Fano | 705/1 |
| 6,321,092 | B1 | 11/2001 | Fitch et al. | 455/456.5 |
| 6,332,127 | B1 | 12/2001 | Bandera et al. | 705/14 |
| 6,353,664 | B1 | 3/2002 | Cannon et al. | 379/142.1 |
| 6,377,810 | B1 | 4/2002 | Geiger et al. | 455/456.2 |
| 6,385,591 | B1 | 5/2002 | Mankoff | 705/14 |
| 6,414,635 | B1 | 7/2002 | Stewart et al. | 342/457 |
| 6,418,308 | B1 | 7/2002 | Heinonen et al. | 455/414 |
| 6,421,441 | B1 | 7/2002 | Dzuban | 379/221.09 |
| 6,427,073 | B1 | 7/2002 | Kortesalmi et al. | 455/414.1 |
| 6,442,391 | B1 | 8/2002 | Johansson et al. | 455/456 |
| 6,442,687 | B1 | 8/2002 | Savage | 713/156 |
| 6,449,497 | B1 | 9/2002 | Kirbas et al. | 455/564 |
| 6,463,533 | B1 | 10/2002 | Calamera et al. | 713/163 |
| 6,470,378 | B1 | 10/2002 | Tracton et al. | 709/203 |
| 6,477,382 | B1 | 11/2002 | Mansfield et al. | 455/458 |
| 6,484,148 | B1 | 11/2002 | Boyd | 705/14 |
| 6,496,931 | B1 | 12/2002 | Rajchel et al. | 713/168 |
| 6,505,046 | B1 | 1/2003 | Baker | 455/456.3 |
| 6,505,048 | B1 | 1/2003 | Moles et al. | 455/456.1 |
| 6,505,049 | B1 | 1/2003 | Dorenbosch | 455/456 |
| 6,522,876 | B1 | 2/2003 | Weiland et al. | 455/414.1 |
| 6,526,275 | B1 | 2/2003 | Calvert | 455/418 |
| 6,545,596 | B1 | 4/2003 | Moon | 340/425.5 |
| 6,546,257 | B1 | 4/2003 | Stewart | 455/456.3 |
| 6,560,442 | B1 | 5/2003 | Yost et al. | 455/67.1 |
| 6,560,461 | B1 | 5/2003 | Fomukong et al. | 455/456 |
| 6,594,482 | B1 | 7/2003 | Findikli et al. | 455/411 |
| 6,618,474 | B1 | 9/2003 | Reese | 379/142.17 |
| 6,618,593 | B1 | 9/2003 | Drutman et al. | 455/456 |
| 6,628,928 | B1 | 9/2003 | Crosby et al. | 455/77 |
| 6,628,938 | B1 | 9/2003 | Rachabathuni et al. | 455/414 |
| 6,647,257 | B2 | 11/2003 | Owensby | 455/414.1 |
| 6,647,269 | B2 | 11/2003 | Hendrey et al. | 455/456 |
| 6,650,901 | B1 | 11/2003 | Schuster et al. | 455/456.1 |
| 6,662,014 | B1 | 12/2003 | Walsh | 455/456.2 |
| 6,675,017 | B1 | 1/2004 | Zellner et al. | 379/142.02 |
| 6,677,894 | B2 | 1/2004 | Sheynblat et al. | 342/357.1 |
| 6,738,808 | B1 | 5/2004 | Zellner et al. | 709/223 |
| 6,799,049 | B1 | 9/2004 | Zellner et al. | 455/456.1 |
| 6,819,929 | B2 | 11/2004 | Antonucci et al. | 455/445 |
| 6,829,475 | B1 | 12/2004 | Lee et al. | 455/419 |
| 6,867,733 | B2 | 3/2005 | Sandhu et al. | 342/357.07 |
| 6,868,074 | B1 | 3/2005 | Hanson | 370/328 |
| 6,876,858 | B1 | 4/2005 | Duvall et al. | 455/456.1 |
| 6,937,869 | B1 | 8/2005 | Rayburn | 455/457 |
| 6,954,147 | B1 | 10/2005 | Cromer et al. | 340/568.1 |
| 7,023,995 | B2 | 4/2006 | Olsson | 380/258 |
| 7,116,977 | B1 | 10/2006 | Moton et al. | 455/419 |
| 2001/0034709 | A1 | 10/2001 | Stoifo et al. | 705/51 |
| 2002/0052781 | A1 | 5/2002 | Aufricht et al. | 705/14 |
| 2002/0077130 | A1 | 6/2002 | Owensby | 455/466 |
| 2002/0107027 | A1 | 8/2002 | O'Neil | 455/456 |

FOREIGN PATENT DOCUMENTS

| | | |
|---|---|---|
| WO | WO 98/19484 | 5/1998 |
| WO | WO 99/27716 | 6/1999 |
| WO | PCT/US01/22295 | 7/2001 |

OTHER PUBLICATIONS

BellSouth "The Real Yellow Pages", Greater Atlanta A-L, 2004 BellSouth Advertising & Publishing Corp., no month listed.

BellSouth "The Real Yellow Pages", Greater Atlanta M-Z, 2004 BellSouth Advertising & Publishing Corp., no month listed.

U.S. Official Action dated Sep. 6, 2006 cited in U.S. Appl. No. 09/630,134.

U.S. Official Action dated Mar. 1, 2004 cited in U.S. Appl. No. 09/740,375.

U.S. Final Official Action dated Sep. 24, 2004 cited in U.S. Appl. No. 09/740,375.

U.S. Official Action dated Feb. 28, 2005 cited in U.S. Appl. No. 09/740,375.

U.S. Final Official Action dated Jul. 26, 2005 cited in U.S. Appl. No. 09/740,375.

Petronis, Scott, "Mapping Technology: The Common Thread," Wireless Review, vol. 17, No. 3, pp. 10-14, Feb. 1, 2000, ISSN: 1099-9248.

U.S. Official Action dated May 7, 2003 cited in U.S. Appl. No. 09/740,373.

U.S. Final Official Action dated Oct. 21, 2003 cited in U.S. Appl. No. 09/740,373.

U.S. Official Action dated Jan. 26, 2004 cited in U.S. Appl. No. 09/740,373.

U.S. Official Action dated Apr. 28, 2005 cited in U.S. Appl. No. 09/740,373.

U.S. Official Action dated Aug. 30, 2005 in U.S. Appl. No. 10/704,775.

U.S. Official Action dated Oct. 4, 2005 in U.S. Appl. No. 10/819,940.

Co-pending U.S. Appl. No. 11/252,039, filed Oct. 17, 2005.

U.S. Official Action dated Jul. 26, 2005 in U.S. Appl. No. 09/740,414.

Co-pending U.S. Appl. No. 09/739,315, filed Dec. 19, 2000.

Co-pending U.S. Appl. No. 09/630,134, filed Aug. 1, 2000.

Co-pending U.S. Appl. No. 09/739,162, filed Dec. 19, 2000.

Co-pending U.S. Appl. No. 10/704,775, filed Nov. 12, 2003.

Co-pending U.S. Appl. No. 10/819,940, filed Apr. 8, 2004.

Co-pending U.S. Appl. No. 09/740,414, filed Dec. 19, 2000.

Co-pending U.S. Appl. No. 09/740,372, filed Dec. 19, 2000.

Official Action dated Nov. 10, 2003 in U.S. Appl. No. 09/740,414.

Final Official Action dated Apr. 21, 2004 in U.S. Appl. No. 09/740,414.

Official Action dated Oct. 5, 2004 in U.S. Appl. No. 09/740,414.

Official Action dated Jun. 21, 2004 in U.S. Appl. No. 09/739,315.

Final Official Action dated Feb. 9, 2005 in U.S. Appl. No. 09/739,315.

Official Action dated Nov. 10, 2003 in U.S. Appl. No. 09/739,162.

Official Action dated Mar. 9, 2004 in U.S. Appl. No. 09/739,162.

Official Action dated Sep. 9, 2004 in U.S. Appl. No. 09/739,162.

Official Action dated Feb. 12, 2003 in U.S. Appl. No. 09/630,134.

Final Official Action dated Jul. 10, 2003 in U.S. Appl. No. 09/630,134.

Official Action dated Jun. 7, 2004 in U.S. Appl. No. 09/630,134.

Official Action dated Jan. 13, 2005 in U.S. Appl. No. 09/630,134.

"Wireless Application Protocol", Oct. 1999 Wireless Internet Today, pp. 1-20.

Official Action dated May 16, 2003 in U.S. Appl. No. 09/740,372.

Official Action dated Oct. 30, 2003 in U.S. Appl. No. 09/740,372.
Official Action dated Apr. 15, 2004 in U.S. Appl. No. 09/740,372.
Final Official Action dated Nov. 2, 2004 in U.S. Appl. No. 09/740,372.
3rd Generation Partnership Project; Technical Specification Group Services and System Aspects; Functional Stage 2 Description of Location Services in UMTS (1999).
Moeglein, Mark et al., "An Introduction to Snap Track™ Server-Aided GPS Technology", available at http://www.snaptrack.com/atwork.html, ION GPS-98, Sep. 15-18, 1998, pp. 333-342.
U.S. Office Action dated Dec. 15, 2006 cited in U.S. Appl. No. 11/522,239.
U.S. Official Action dated Feb. 3, 2006 cited in U.S. Appl. No. 09/739,315.
U.S. Official Action dated Mar. 10, 2006 cited in U.S. Appl. No. 11/252,039.
U.S. Appl. No. 11/298,419, entitled "System and Method for Using Location Information to Execute an Action" filed Dec. 9, 2005, Inventors: Robert T. Moton Jr.; Mark J. Enzmann; and Samuel N. Zellner.
U.S. Appl. No. 11/298,149, entitled "System and Method for Using Location Information to Execute an Action" filed Dec. 9, 2005, Inventors: Robert T. Moton Jr.; Mark J. Enzmann; and Samuel N. Zellner.
U.S. Official Action dated Feb. 24, 2006 cited in U.S. Appl. No. 09/630,134.
U.S. Official Action dated Apr. 21, 2006 cited in U.S. Appl. No. 11/322,531.
U.S. Final Office Action dated Jan. 11, 2007 cited in U.S. Appl. No. 11/322,531.
U.S. Office Action dated Jan. 9, 2007 cited in U.S. Appl. No. 11/406,881.
U.S. Office Action dated Jan. 16, 2007 cited in U.S. Appl. No. 11/187,347.
U.S. Final Office Action dated Feb. 6, 2007 cited in U.S. Appl. No. 11/252,039.
U.S. Final Office Action dated Apr. 2, 2007 cited in U.S. Appl. No. 09/630,134.
U.S. Office Action dated Apr. 6, 2007 cited in U.S. Appl. No. 11/298,419.

SYSTEM AND METHOD FOR USING LOCATION INFORMATION TO EXECUTE AN ACTION

CROSS-REFERENCE TO RELATED APPLICATIONS

This application is a continuation-in-part of the U.S. patent application Ser. No. 09/739,340 filed Dec. 19, 2000, now U.S. Pat. No. 7,116,977 which is incorporated herein by reference in its entirety.

FIELD OF THE INVENTION

The present invention relates generally to consumer electronics and telecommunication systems, and in particular, to a system and method for using location information associated with wireless devices.

BACKGROUND OF THE INVENTION

The use of wireless devices is increasing at a rapid rate. A majority of the people living in large metropolitan areas use one or more wireless devices on a daily basis. These people communicate with each other or access information on the Internet using, among other devices, wireless telephones, interactive pagers, personal digital assistants, and handheld computers. As technology continues to improve, wireless devices will become more useful: at the same time, they will decrease in size and weight, making them more portable than ever. Consequently, consumers may carry their wireless devices wherever they go. For some people, their wireless device will become indispensable.

The widespread use of the wireless telephones in the United States has prompted the Federal Communications Commission (FCC) to promulgate new rules related to emergency call processing. The FCC's wireless Enhanced 911 (E911) rules require certain Commercial Mobile Radio Services (CMRS) carriers to begin transmission of enhanced location and identity information in two phases. The first phase, started on Apr. 1, 1998, required wireless service providers to transmit a 911 caller's number and section of the cell site from which the call is originated to a public safety answering point (PSAP). The second phase, starting on Oct. 31, 2001, requires all wireless service providers to locate two-thirds of all 911 callers within 125 meters of their physical locations. In other words, for all 911 calls received, a PSAP must be able to pinpoint 67% of the callers within 125 meters.

Under the FCC rules, wireless communication-networks and wireless telephones (or any wireless devices that can be used to call 911), must provide both the identity and location of the caller to a 911 dispatcher. To provide a caller's identity, the wireless device will furnish a device identification, e.g., a mobile identification number (MIN), indicating in most instances the telephone number of the device. To provide a caller's location, the wireless communication networks and wireless devices will use a network-based location system or a handheld location system installed within the wireless devices, or a combination of the two systems. An example of a handheld location system is a Global Positioning System (GPS) receiver. U.S. Pat. No. 5,663,734, which is incorporated herein by reference, discloses a GPS receiver and a method for processing GPS signals.

The E911 mandate has accelerated technological advances in technology. Many new innovations have been achieved to provide solutions to a wide range of problems. Although technological improvements bring unprecedented convenience to the world, they also come with some undesirable side effects. For example, the discourteous use of wireless telephones in public places such as on commuter trains or at movie theaters. In some places, such as in most courtrooms, all wireless device users must have their devices turned off to prevent distracting ringing and beeping noises. Users who forget to turn their wireless devices back on after they leave these places may miss important calls.

The use of wireless communications services is also expensive. For example, payment to wireless service providers for the use of wireless telephones is usually based on the amount of "airtime" consumed. The longer a user is on the telephone, the more expensive the conversation will be. Charges for use of the wireless telephone call could be significantly higher when the user is beyond his or her home market, at a location where the wireless telephone roams in a different market served by a different wireless service provider. Currently, to avoid expensive roaming charges for answering incoming calls, the user must remember to turn off the telephone when he or she leaves the home market. Alternatively, the user must remember not to answer an incoming call when the telephone rings while it is roaming.

The existing wireless communications technology does not allow the wireless device users (the subscribers) to activate one of more service features based on the user's physical location, i.e., without the user's manual activation of the features. For example, a wireless telephone user must manually activate a call forwarding feature subscribed to by him or her if the user wants to have all calls forwarded to his or her voice mailbox each time the user enters a public place such as a movie theater, a concert hall, or a courtroom. Once the user leaves the public place, the user must remember to deactivate the call forwarding feature. To reduce the amount of airtime used, the user must also activate a call forwarding feature to route all incoming calls intended for the wireless telephone to a home wireline telephone when the user is at home where the wireline telephone is located. Similarly, if the user wishes to accept calls intended for the wireless telephone using a wireline telephone at work, the user must manually activate the call forwarding feature to route calls to his or her office when the user is at work. In short, there is a need for a system and method to execute an action, such as routing telephone calls, based on location information pinpointing the location of a wireless device.

SUMMARY OF THE INVENTION

The present invention is a system and method for using location information associated with wireless devices. The location information may be used to execute an action. The action may be executed via a number of networks, including a wireless communications network (some examples includes Global System for Mobile Communications (GSM), Code Division Multiple Access (CDMA), Wideband CDMA (W-CDMA), Orthogonal Frequency Division Multiple Access (OFDMA), Evolution Data Optimized (EVDO), Ultra-Wideband UWB, third-generation (3G) wireless networks, fourth-generation (4G) wireless networks, all of the IEEE 802.XX wireless networks, etc.), a public switched telephone network (PSTN), a local area network (LAN), and a global computer network. The wireless device may be any wireless apparatus. For example, the wireless device may be a wireless telephone, a personal digital assistant, a handheld computer, or an interactive pager. Furthermore, a system of the present invention may be incorporated as part of a wristwatch, an attache case, or an automobile.

The present invention comprises a location system that can generate the location information pinpointing the physical location of the wireless device. In preferred embodiments of the present invention, the location information comprises point coordinates such as a longitude and a latitude. The location system can be a network-based component or it can be a handheld unit provisioned at the wireless device. A network-based location system can generate the location information using a plurality of methods. In an exemplary embodiment of the present invention, the network-based location system can generate the location information using triangulation across cell sites. An example of a handheld location system is a GPS receiver that is in communication with a constellation of GPS satellites. In preferred embodiments, both network-based and handheld location systems can be used to provide redundancy, reliability, and increased accuracy.

The present invention further comprises a feature server that uses the location information to execute an action through a network such as a wireless communications network, a PSTN, a LAN, or a global computer network. The feature server comprises a memory, as an integral or separate component, for storing data that includes, among other things, the location information, identity information of the wireless device, and subscriber rules. In preferred embodiments, the identity information comprises a unique identification number of the wireless device. For example, the mobile identification number (MIN) of a wireless telephone could be used as the identity information. For other wireless devices, each device's serial number may be used as the identity information. The subscriber rules may be call routing instructions, preferences for implementing a service, or other subscriber defined rules. The feature server is preferably a Wireless Application Protocol (WAP) compatible component having a wide range of wireless communication capabilities. For example, the feature server can communicate with various networks to process telephone calls and to operate a wide range of machines including office equipment and home appliances. Examples of operable machines may be found among the listings and advertisements found in volumes A-L and M-Z of the 2005 BellSouth Greater Atlanta Real Yellow Pages, both of which are herein incorporated by reference in their entirety. This feature server may interface to plain old telephone service (POTS), voice over internet protocol (VOIP) and other communication devices in order to enable machine communications and control.

The present invention further comprises methods for using location information in conjunction with service-specific parameters when requesting a particular service. Examples of services include taxi services, pharmacy services, medical services, home repair services, and so forth. Providers of services may be listed in response to a request, or may be contacted on behalf of a user making a request. Location information and service-specific parameters can be used in selecting an optimal provider.

Preferred embodiments of the present invention comprise a front end through which the feature server communicates with the networks. In preferred embodiments, a user of the present invention (the subscriber) can manage his or her service profile through the front end. For example, the subscriber may access the front end, via a global computer network or a PSTN, to define the subscriber rules for using the present invention.

The present invention can have a large number of applications. One embodiment of the present invention is suitable for wireless telephony. In this embodiment, the wireless device can be a wireless telephone. The feature server can activate one or more wireless telephone service features using the location information generated by the location system. In other words, when the wireless telephone is in a first location, a first service feature can be activated. Similarly, when the wireless telephone is in a second location, a different service feature may be used. For example, a wireless telephone service subscriber to the present invention may have all calls intended for his or her wireless telephone automatically routed to a wireline telephone when the subscriber enters the premises within which the wireline telephone is located.

In another embodiment, the present invention can enable a subscriber to track the location of a package during delivery. In this embodiment, the wireless device can be an electronic transmitter that is attached to the package. As the package is being delivered, the location system generates location information pinpointing the location of the package. Based on the location information, the feature server can execute one or more tasks, including informing the subscriber of the status of the delivery and providing the recipient of the package an estimated time of arrival.

In still another embodiment of the present invention, the wireless device is a handheld computer. Using the location information pinpointing the location of the handheld computer, the subscriber, through the feature server, can communicate with a computer system, such as a LAN or the Internet, to operate a machine. The machine may be, for example, an electrical fan at the subscriber's home or a fax machine in the subscriber's office.

Accordingly, it is an object of the present invention to provide new uses of location information that indicates the location of the wireless device.

It is another object of the present invention to provide wireless telephone users additional flexibility to manage their telephone calls.

It is another object of the present invention to keep the sender and the receiver of a package well informed of the status of the delivery.

It is another object of the present invention to use location information to remotely operate a machine such as office equipment or a home appliance.

These and other objects of the present invention are described in greater detail in the detailed description of the invention, the appended drawings, and the attached claims.

DETAILED DESCRIPTION OF THE INVENTION

Figure 1:
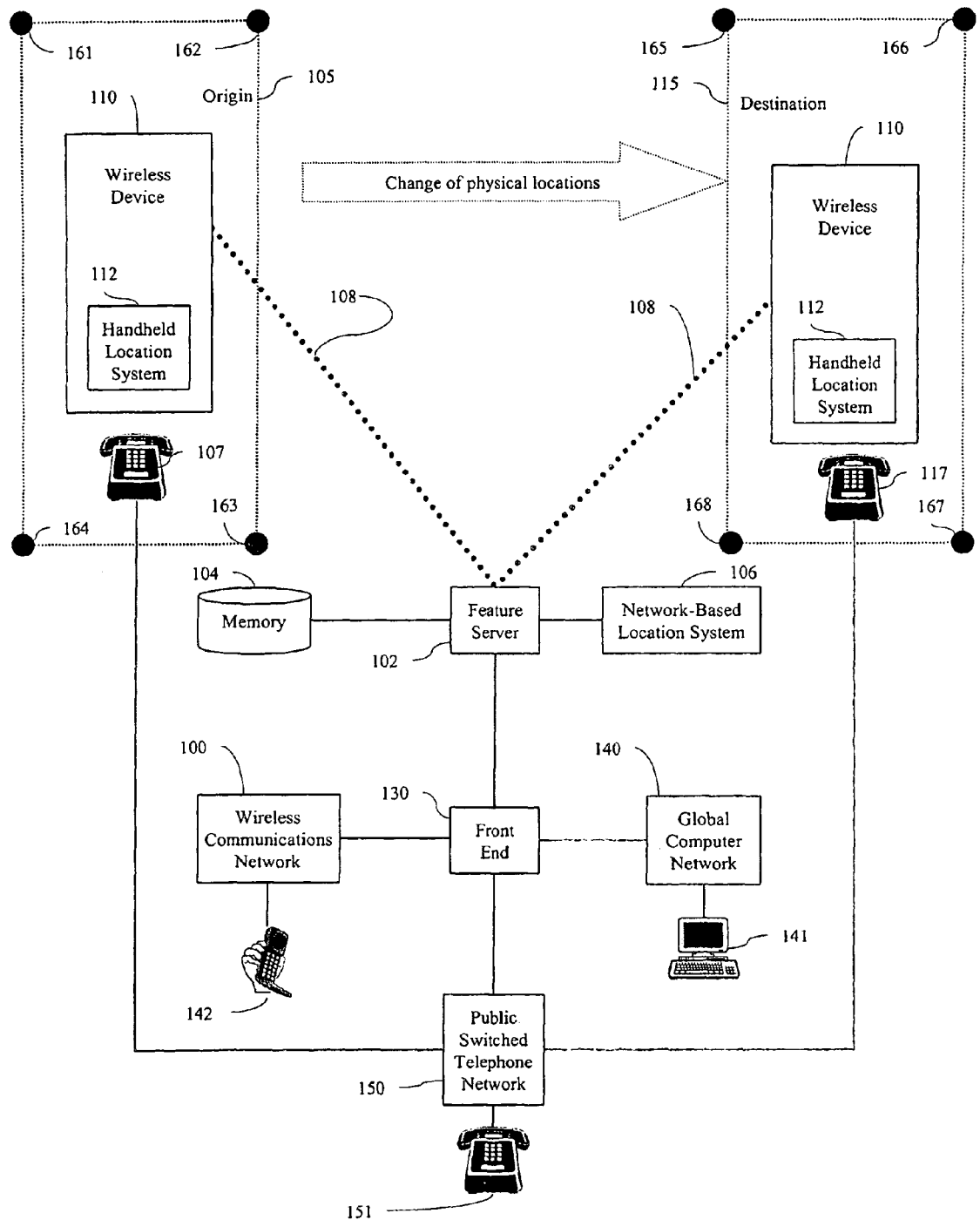
FIG. 1 is a schematic diagram showing the system architecture of an embodiment of the present invention, and illustrating a wireless device in motion, moving from an origin to a destination.

FIG. 1 is a schematic diagram showing the system architecture of an embodiment of the present invention, and illustrating wireless device 110 moving from origin 105 to destination 115. Wireless device 110 may be any wireless apparatus. For example, wireless device 110 may be a wireless telephone, a handheld computer, an interactive pager, or a personal digital assistant. Wireless device 110 may also be incorporated as a component of, among other things, a wrist watch, an attache case, or an automobile. Preferably, wireless device 110 is a WAP-compatible thin client having a thin browser adapted to communicate with wireless communication network 100 and global computer network 140.

To track where wireless device 110 is located, the system architecture can include one or both of network-based location system 106 and handheld location system 112. Network-based location system 106 may be a component of a wireless communication network 100. Handheld location system 112 can be incorporated as part of wireless device 110. One or both of network-based location system 106 and handheld location system 112 can generate location information pinpointing the location of wireless device 110. In preferred embodiments, both location systems are compatible with the Geographic Information System (GIS) and the Global Positioning System (GPS). Handheld location system 112 is preferably a GPS receiver that is in wireless communication with a constellation of GPS satellites. In preferred embodiments, both location systems can be used to provide redundancy, accuracy, and reliability. The location information comprises point coordinates of wireless device 110. The point coordinates comprise an X component and a Y component of a coordinate system. In an exemplary embodiment of the present invention, the location information comprises a longitude and a latitude. For increased accuracy and granularity, the location information can further comprise an altitude. In preferred embodiments, the location information can pinpoint the location of wireless device 110 to within 125 meters, as required by the E911 mandate. Both location systems are preferably WAP compatible components.

Figure 2:
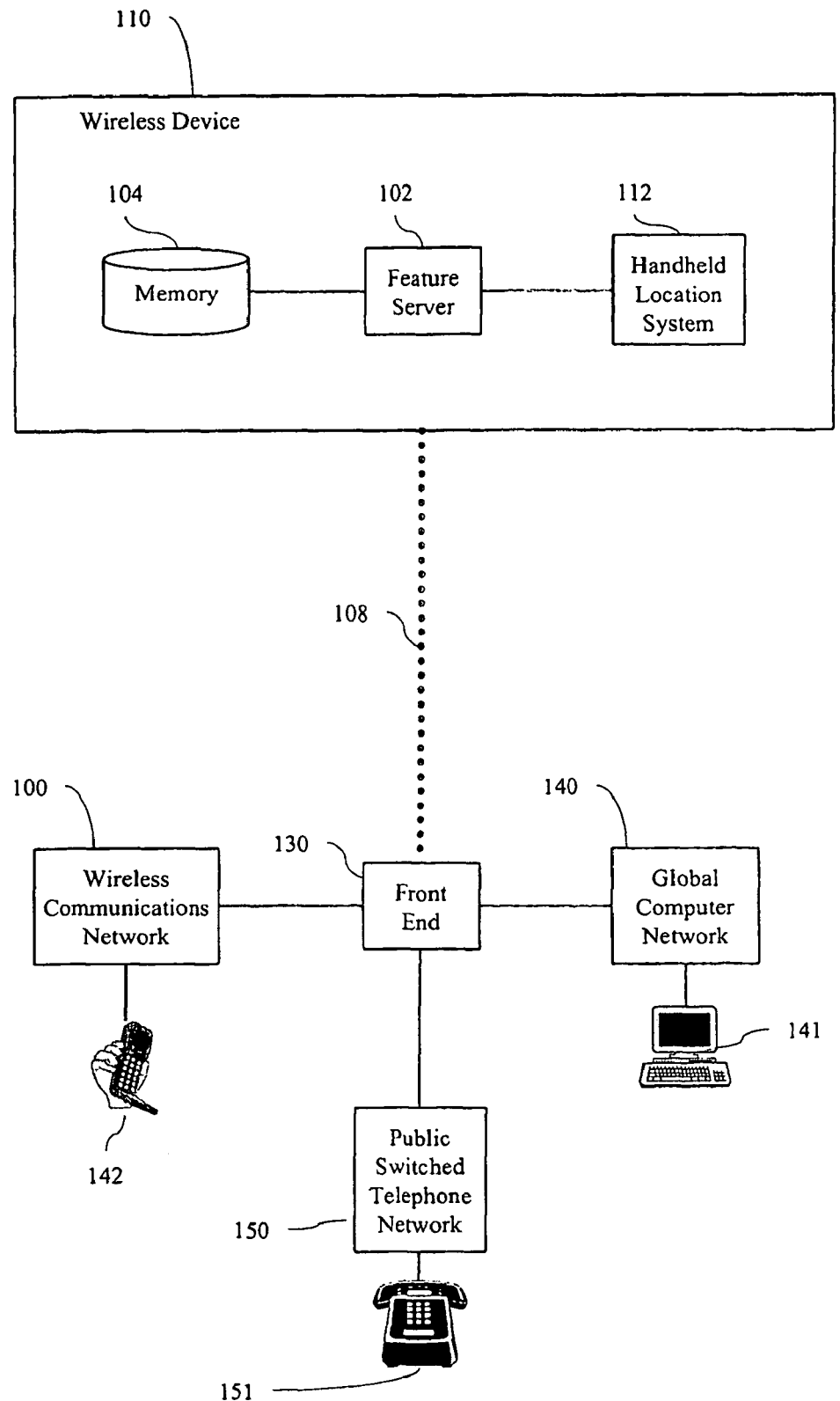
FIG. 2 is a schematic diagram showing an alternative embodiment of the system architecture of the present invention.

In preferred embodiments, feature server 102 is GIS, GPS, and WAP compatible. Feature server 102 can receive the location information from location systems 106 and 112. Feature server 102 can also receive identity information of wireless device 110. The identity information may comprise, for example, a serial number of wireless device 110. The identity information may also be a mobile identification number of a wireless telephone. Like the location systems, feature server 102 may be a component separate from wireless device 110, as shown in FIG. 1. In other embodiments, feature server 102 may be a portable unit that is part of wireless device 110 as shown in FIG. 2. In still other embodiments, only one of feature server 102 and location system 112 is provisioned at wireless device 110.

Using the location information and the identity information of wireless device 110, feature server 102 can be adapted to execute a large number of actions according to subscriber rules, instructions, or preferences provided by a subscriber. For example, in an embodiment involving wireless telephony in which wireless device 110 is a wireless telephone, feature server 102 could use the location information and the identity information to activate one or more service features subscribed to by the subscriber who uses the wireless telephone. Any service features available in wireless communications may be activated or deactivated by the present invention. These service features can include call forwarding, call placing or initiating, and voicemail greeting recording. In an embodiment involving a global computer network, feature server 102 could use the information to, for example, send an e-mail or operate a machine over the global computer network.

The subscriber rules, instructions, or preferences may be specified by the subscriber or created by feature server 102 based on the subscriber's habits for using wireless device 110. The subscriber rules may be provided to feature server 102 via a number of channels. For example, the subscriber rules may be keyed in by the subscriber or other persons using a keypad on wireless device 110. Alternatively, the subscriber rules may be provided via wireless communications network 100, global computer network 140, and PSTN 150.

As discussed above, in preferred embodiments of the present invention, location systems 106 and 112, and feature server 102 are WAP compatible. WAP is an application environment and set of communication protocols for wireless devices designed to enable manufacturer-, vendor-, and technology-independent access to global computer network 140 and advanced wireless telephony services provided by wireless communication network 100. An example of global computer network 140 is the Internet. WAP provides wireless Internet access through digital cellular networks, giving network users a menu driven method for downloading information, such as flight schedules and bank account balances, to wireless devices from the Internet. WAP is described in WAP version 1.1, which is herein incorporated by reference in its entirety.

Although shown as a separate component in FIGS. 1 and 2, memory 104 could be an integrated component of feature server 102. Memory 104 can store, for I example, the location information, the identity information, and the subscriber rules. In addition, memory 104 may be populated with, among other things, a database that contains point coordinates of locations or areas likely to be encountered or visited by wireless device 110. In addition, memory 104 may contain a database relating or associating popular places with their location information including longitudes and latitudes. Preferably, information contained in memory 104 is in the GIS or GPS format, or in both formats.

Origin 105 shown in FIG. 1 is an area delineated by nodes 161, 162, 163 and 164. Destination 115 is defined by nodes 165, 166, 167, and 168. Each of nodes 161 through 168 can be characterized by point coordinates. The point coordinates comprise an X component and a Y component of the same coordinate system that defines the location information. Preferably, the point coordinates comprise a longitude and a latitude. Wireline telephones 107 and 117 are located at origin 105 and destination 115, respectively.

In preferred embodiments, the present invention further comprises front end 130, which is an intermediary component that connects feature server 102 to wireless communications network 100, global computer network 140, and public PSTN 150. As indicated in FIGS. 1 and 2, wireless communications network 100, global computer network 140, and PSTN 150 are accessible by various machines, including computer 141, wireless telephone 142, and wireline telephone 151.

Front end 130 comprises a profile management system. Through front end 130, a subscriber of the present invention may supply, modify, or otherwise manipulate service features controlled by feature server 102. For example, the subscriber may change the subscriber rules using front end 130. The subscriber may access front end 130 using computer 141, wireless telephone 142, or wireline telephone 151, in addition to wireless device 110 itself.

Interactions among the various components described above have a large number of applications in wireless communications and consumer electronics. For the purposes of demonstration, some specific embodiments or examples of how the present invention may be implemented are discussed below. Although the examples best illustrate the present invention, one of ordinary skill in the art would appreciate that other embodiments are possible in light of the disclosure. In addition, while the system operation described herein and illustrated in the diagrams and flowcharts contains many specific details, these specific details should not be construed as limitations on the scope of the invention, but rather as examples of preferred embodiments thereof. As would be apparent to one of ordinary skill in the art, many other variations on the system operation are possible, including differently grouped and ordered method steps. Accordingly, the scope of the invention should be determined not by the embodiments illustrated, but by the appended claims and their equivalents.

Figure 3:
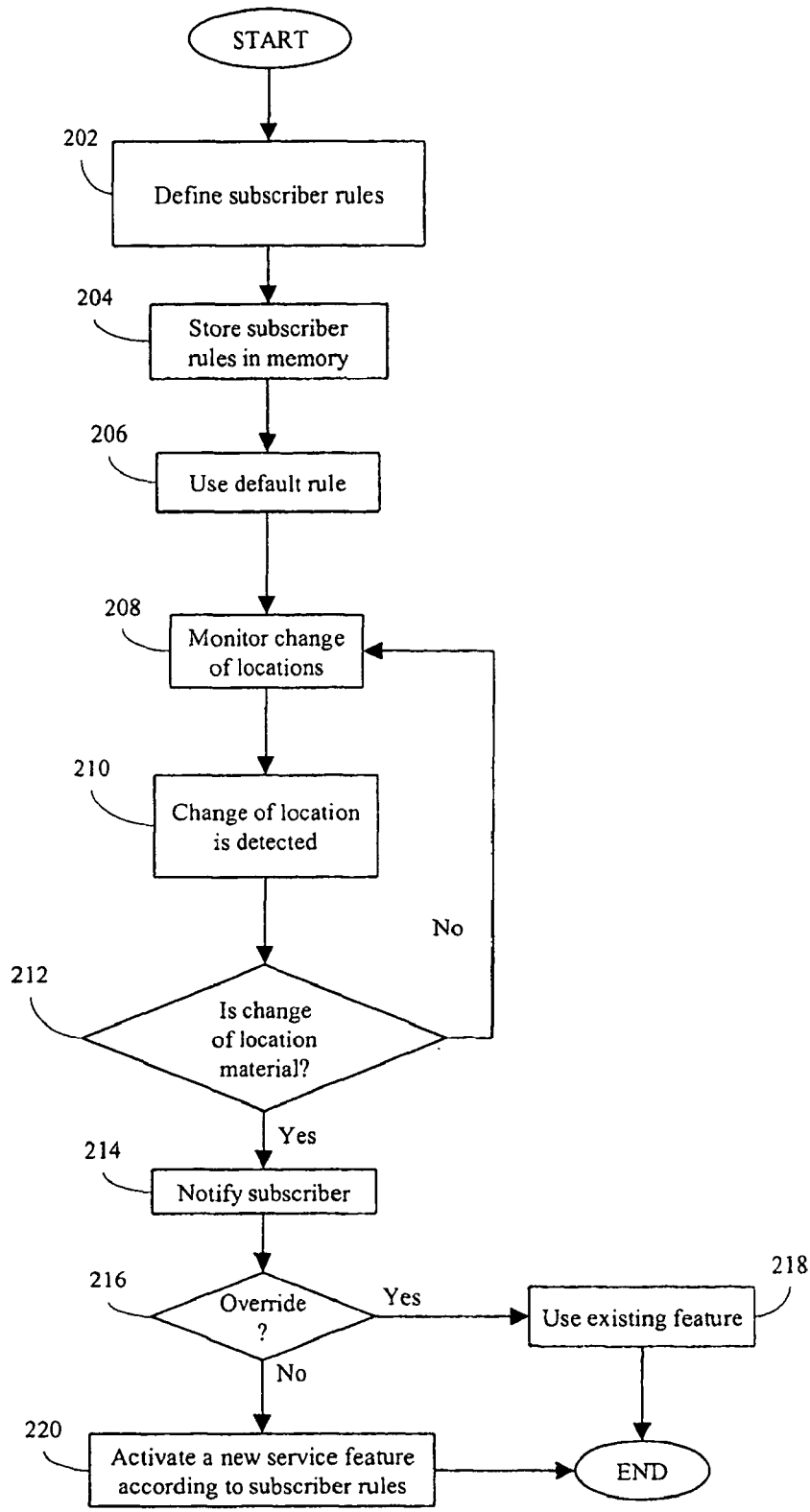
FIG. 3 is a flowchart illustrating general steps involved in using an embodiment of the present invention.

FIG. 3 is a flowchart illustrating general steps involved in using an embodiment of the present invention. For clarity, references are made to components shown in FIGS. 1 and 2. In specific embodiments of the present invention, one or more of these general steps may be used. Furthermore, each of the general steps may include one or more sub-steps. Although these general steps and sub-steps are discussed herein sequentially, the steps may be implemented in any combination and in any logical order to accomplish a specific purpose. Furthermore, specific embodiments of the present invention may include additional steps not discussed herein.

In step 202, a subscriber to the service of the present invention, e.g., the user of wireless device 110 can define a set of subscriber rules, instructions, or preferences. The subscriber rules relate or associate location information with the execution of an action. Referring to FIGS. 1 and 2, assuming wireless device 110 is a wireless telephone, specific examples of the subscriber rules may include:

(1) When the wireless telephone is in origin 105, i.e., within the boundaries delineated by nodes 161, 162, 163 and 164, feature server 102 routes all calls intended for the wireless telephone to wireline telephone 107.

(2) When the wireless telephone is in destination 115, i.e., within the boundaries delineated by nodes 165, 166, 167, and 168, feature server 102 routes all calls intended for the wireless telephone to wireline telephone 117.

(3) When the wireless telephone is in neither origin 105 nor destination 115, use a default rule, e.g., feature server 102 allows the wireless telephone to accept calls.

In step 204, the subscriber rules can be stored in memory 104. The subscriber rules may be stored using a number of channels, including via an input device on wireless device 110, other components of wireless communications network 100, global computer network 140, and PSTN 150 that are shown in FIGS. 1 and 2. The subscriber rules may be stored in memory 104 using any known format. In preferred embodiments, the subscriber rules can be contained in a database that relates a specific location with a specific action to be executed when wireless device 110 is in the specific location.

Feature server 102 can operate under a default rule in step 206, e.g., allowing wireless device 110 to accept all calls, unless wireless device 110 is at origin 105 or destination 115. In step 208, feature server 102 can monitor location information to determine whether wireless device 110 has changed locations. As mentioned above, the location information may be generated by either handheld location system 112 or network-based location system 106, or by a combination of both location systems. The location systems can generate the location information as specified in the subscriber rules. For example, the location information may be generated at regular intervals. Furthermore, the location systems may generate the location information at designated or scheduled times specified by the subscriber rules.

In preferred embodiments, handheld location system 112 is a GPS receiver that can generate the location information using information received from a constellation of GPS satellites. Network-based location system 106 can generate the location system using triangulation across cell sites based on signal strength experienced by wireless device 110. In other embodiments, the location information may be generated using designation of cell sites. For example, if origin 105 and destination 115 are within wireless coverage of two distinct and separate cell sites of a wireless communications network in which wireless device 110 operates, the location information pinpointing the location of wireless device 110 may be determined based on which cell site is exchanging wireless signals with wireless device 110.

For discussion purposes, it is assumed that wireless device 110 is initially located in origin 105, i.e., within the area delineated by nodes 161, 162, 163, and 164. The location system can generate initial location information and provide feature server 102 with the initial location information. Feature server 102 can store the initial location information in memory 104, and route all calls intended for wireless device 110 to wireline telephone 107. Assuming further that wireless device 110 is then moved from origin 105 to destination 115, crossing a first boundary defined by nodes 162 and 163 and a second boundary defined by nodes 165 and 168. One or both location systems 106 and 112 can generate a first subsequent location information after wireless device 110 crosses the first boundary. The first subsequent location information can then be provided to feature server 102. In step 210, feature server 102 can detect a change of location because the first subsequent location information is different from the initial location information.

In step 212, a determination can be made on whether the change of location is material. The materiality depends on whether wireless device 110 has been moved to a different location in which a different action should be executed by feature server 102. In the example, a change is considered not material unless wireless device 110 crosses the first or the second boundaries. Here, since the first subsequent location information indicates that wireless device 110 has crossed the first boundary, the change is considered material.

In step 214, the subscriber can be notified that a material or actionable change of location has been detected, and the subscriber can be given an opportunity to override the subscriber rules. In preferred embodiments, a notification provided to the subscriber may be executed using any known method. For example, a vibration on, or a ringing tone from, wireless device 110 could be used to alert the subscriber that, unless the subscriber otherwise overrides, a new service feature will be activated. The subscriber may then see or hear a message, e.g., "You have left origin 105, unless you press the Cancel key, all incoming calls will be accepted."

If in step 216 the subscriber chooses to override, she can press a key that is responsive to the notification, e.g., the "Cancel" key, on wireless device 110. The process then goes to step 218, in which the existing service feature will continue to operate, i.e., feature server 102 will continue to forward all calls intended for wireless device 110 to wireline telephone 107. Otherwise, the process goes to step 220, and a new service feature is activated according to the subscriber rules, i.e., stop forwarding calls to wireline telephone 107, and begin accepting calls using wireless device 110.

If in step 208 a second subsequent location information is generated before wireless device 110 crosses the second boundary, then in step 210, when feature server 102 compares the second subsequent location information with the first subsequent location information, feature server 102 detects a change of location. In step 212, this new change of location is considered not material because wireless device 110 did not cross either the first or the second boundaries. In this case, the process returns to step 208.

If in step 208 a third subsequent location information is generated after wireless device 110 crossed the second boundary defined by nodes 165 and 168, a comparison of the second and the third subsequent location information by feature server 102 in step 210 then indicates that another change of location has been detected. In step 212, feature server 102 may determine that the change is material. In step 214, a notification, e.g., "You have entered destination 115, unless you press the Cancel key, all incoming calls will be forwarded to wireline telephone 117." The subscriber may then decide in step 216 whether to override the subscriber rules.

Instead of defining the subscriber rules ahead of time in step 202 for feature server 102 to follow, feature server 102 may be programmed to define the subscriber rules based on the subscriber's habits for using wireless device 110. For example, if all location information generated by the location system and all actions executed by the subscriber are stored in memory 104 by feature server 102, after a definite period of time, sufficient data would be collected to establish what the subscriber's habits were for using wireless telephone 110. The subscriber may then decide whether to adopt the habits as the subscriber rules.

There are numerous applications and embodiments for the present invention. Set forth below are four specific examples of how the present invention may be used. Although these examples best illustrate the present invention, one of ordinary skill in the art would appreciate that these specific examples contain many specific details, and these specific details should not be construed as limitations on the scope of the invention. Accordingly, the scope of the invention should be determined not by the embodiments and the examples illustrated, but by the appended claims and their equivalents.

Figure 4:
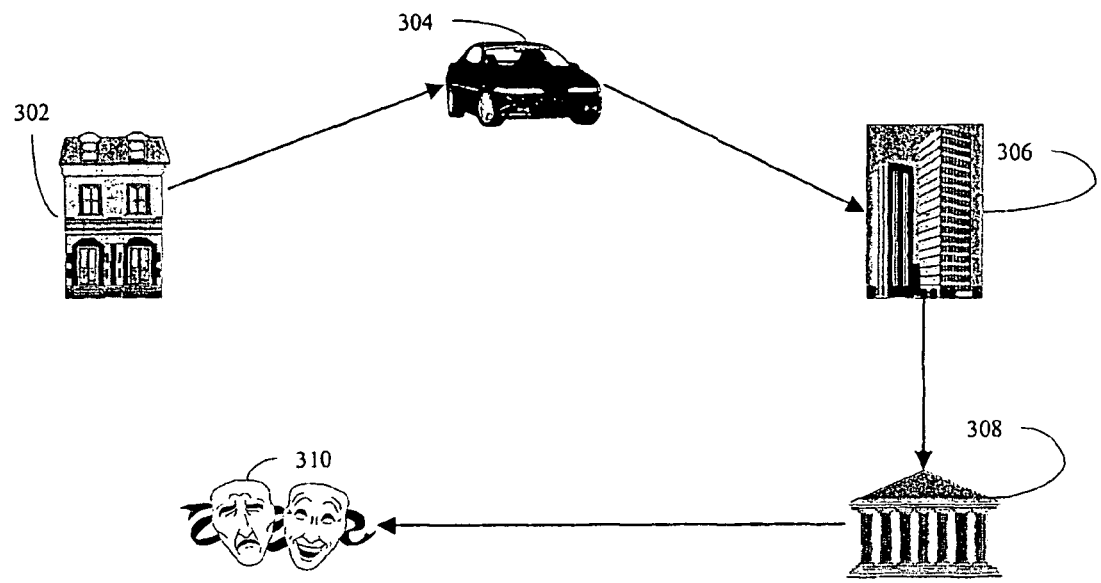
FIG. 4 is a schematic diagram illustrating a specific example of a subscriber using a first specific embodiment of the present invention within a wireless communication network.

FIG. 4 is a schematic diagram illustrating a specific example of the use of a first specific embodiment of the present invention by a subscriber who travels within a wireless communication network operated by a wireless service provider. Home 302, automobile 304, building 306, courthouse 308, and theater 310 are places that the subscriber spends some of his time most days, and each of these places are located within wireless coverage of the wireless service provider.

In this example, the subscriber has wireless device 110. The subscriber has a subscription to the service of the present invention. The subscriber also has a home wireline telephone and an office wireline telephone located at home 302 and the seventh floor of building 306, respectively. Although the subscriber does not want to miss any incoming calls to his wireless device 110, he does not want to receive all calls on his wireless device 110 all the time either. The subscriber wishes to use his wireless device 110 to receive calls only when his is not in one of four places: home 302, the seventh floor of building 306, courthouse 308, and theater 310. When at home 302, he wants all calls to be forwarded to his home wireline telephone. When on the seventh floor of building 306, he wants all calls to be forwarded to the office wireline telephone. When in courthouse 308, he wants to have his wireless device 110 temporarily disabled and all calls are forwarded to his voice mailbox. When in theater 310, the subscriber wants to have an option to decide whether to receive an incoming call. In all other places, he is available to use his wireless device 110 to answer calls, receive voice mail messages, and using his wireless device 110 to access information on a global computer network.

Referring to both FIGS. 1 and 4, the subscriber's wireless device 110 may be a wireless telephone without handheld location system 112. Wireless device 110, network-based location system 106, feature server 102, and memory 104 are all part of the wireless communication network operated by the wireless service provider of which the subscriber is a customer. In a different example, the system architecture shown in FIG. 2 may be used.

Figure 5:
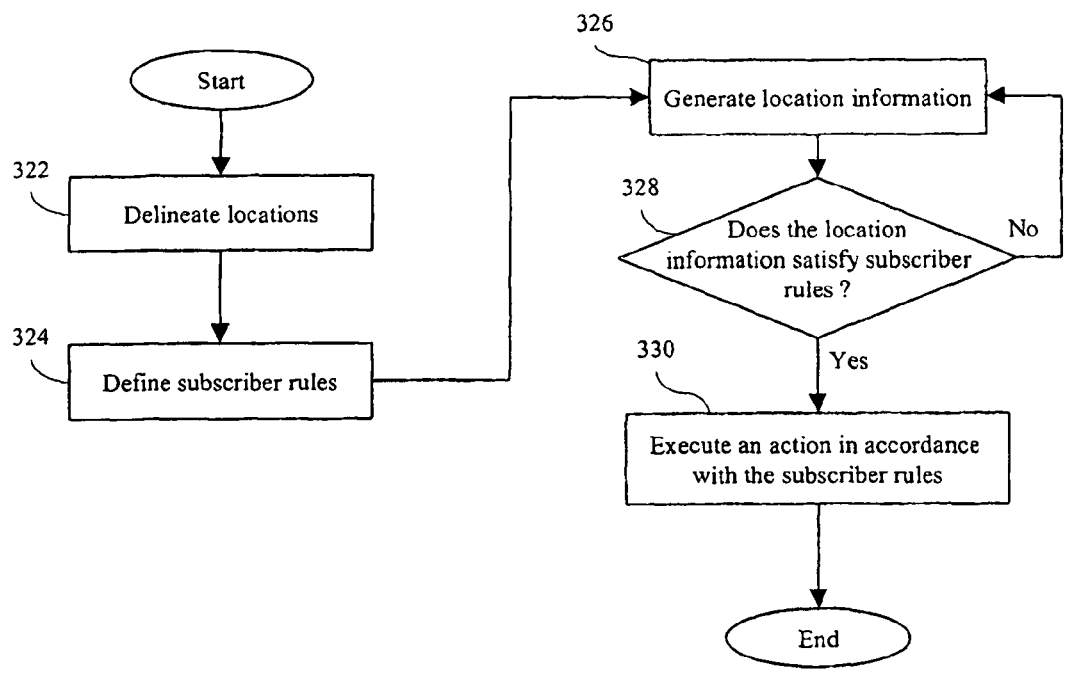
FIG. 5 is a flowchart illustrating the steps involved in using the first specific embodiment shown in FIG. 4.

FIG. 5 is a flowchart illustrating the steps involved in using the first specific embodiment shown in FIG. 4. In step 322, each of home 302, the seventh floor of office 306, courthouse 308, and theater 310 is delineated. Delineation may be performed using a number of methods. One delineation method comprises the use at least three corner nodes. Another delineation method may comprise the use of one center node and a radius. Each node can comprise point coordinates. Preferably, the point coordinates comprise an X component and a Y component of a coordinate system. For increased capability, the point coordinates can further comprise a 2 component of the coordinate system. One coordinate system that is suitable for the present invention has longitude, latitude, and altitude as its X, Y, and 2 components, respectively.

For example, home 302 could be delineated as a circular area with a 125-meter radius with a center node. Wireless device 110 can be considered to be within home 302 as long as location information generated by location system 106 indicates that wireless device 110 is within the 125-meter circle, regardless of the altitude. The seventh floor of building 306 could be defined as a block having eight nodes, each of which has X, Y, and Z components. Courthouse 308 and theater 310 may be similarly defined using the same or other geometrical shapes including an ellipse or a polygon with at least three nodes for two dimensional delineations.

In step 324, specific call routing instructions can be defined and stored in memory 104 shown in FIGS. 1 or 2. Storage of the call routing instructions in memory 104 may be performed via different channels including wireless communications network 100, global computer network 140, and PSTN 150. Table 1 below contains call routing instructions for the subscriber.

TABLE 1

Call Routing Instructions

| Location of wireless device 110 | Instructions |
| --- | --- |
| Home 302 | Forward calls to home wireline telephone |
| Seventh Floor of Building 306 | Forward calls to office wireline telephone |
| Courthouse 308 | Forward calls to voice mailbox |
| Theater 310 | Turn off ringer, turn on vibrator, and provide call management options |
| All other places | Enable ringer and accept all incoming calls (the default rule) |

The call routing instructions in Table 1 may be paraphrased as follows:

(1) When wireless device 110 is within 125 meters of the center node of home 302, all incoming calls are forwarded to the subscriber's home wireline telephone.

(2) When wireless device 110 is on the seventh floor of building 306, all incoming calls are forwarded to the subscriber's office wireline telephone.

(3) When wireless device 110 is in courthouse 308, all incoming calls are forwarded to the subscriber's voice mailbox.

(4) When wireless device 110 is in theater 310, the ringer feature of wireless device 110 is disabled and the vibration feature is enabled. In addition, a menu of call management options is presented to the subscriber on the display of wireless device 110.

(5) When wireless device 10 is not in any of the above four places, all incoming calls are alerted to the subscriber using the ringer feature (the default rule).

For convenience, both location delineations and call routing instructions can be collectively referred to herein as subscriber rules. The subscriber rules could be initially set up, or subsequently modified, by the subscriber via a representative of the wireless service provider, or through a "self-help" feature using, among other things, wireless device 10 itself, wireline telephone 151 through PSTN 150, computer 141 through global computer network 140, or wireless telephone 142 through wireless communications network 100. Wireless communications network 100 may be the same or a different network of which wireless device 110 is apart.

In step 326, a location system, such as network-based location system 106 shown in FIG. 1, can generate location information pinpointing the location of wireless device 110, and the location information is provided to a feature server, such as feature server 102 shown in FIG. 1. As discuss above, the location information most preferably comprises point coordinates having the X and Y, and possibly, Z, components of the coordinate system. The location information may be generated using a number of different methods. One method is by triangulation of signal strengths experienced by wireless device 110 when in communication with a plurality of antennas. The location information may be generated at regular intervals, e.g., every five minutes. In preferred embodiments, the location information can be generated according to a schedule prepared by the subscriber as part of the subscriber rules. For example, the subscriber may specify that the location information be generated every five minutes between 8 a.m. and 8 p.m. on Monday to Friday; and at all other times, every hour on the hour.

In step 328, feature server 102 can be adapted to review the location information and determines whether the location information fits within the parameters of the subscriber rules. If the determination is in the affirmative, the process goes to step 330. Otherwise, the process returns to step 326.

Referring to FIG. 4 and assuming the subscriber brings wireless device 110 to various locations in the following order: home 302, building 306, courthouse 308, and theater 310. When in transit from home 302 to building 306, the subscriber uses automobile 304. In step 328, when the location information indicates that wireless device 110 is at home 302, an incoming call intended for wireless device 110 is forwarded to the home wireline telephone in step 330. As soon as the subscriber leaves home 302, i.e., he is more than 125 meters away from the center node of home 302, feature server 102, in step 330, stops forwarding all calls intended for wireless device 110 to the home wireline telephone. Also in step 330, feature server 102 can operate under the default rule, i.e., it can allow wireless device 110 to accept all calls. Therefore, while the subscriber is in automobile 304 from home 302 to building 306, he receives calls intended for wireless device 110 using wireless device 110 itself.

Wireless device 110 can continue to receive calls even as the subscriber enters the parameter of building 306, i.e., the X and Y components of the location information are within the delineated boundaries of building 306. The call forwarding feature to his office wireline telephone is not activated until he reaches the seventh floor, i.e., when the Z component of the location information matches the value specified in the subscriber rules. If the subscriber goes to a different floor of building 306, e.g., the sixth floor or the tenth floor, wireless device 110 can return to use the default rule, i.e., it can receive all calls.

When the location information indicates that the subscriber has entered courthouse 308, feature server 102 immediately activates the voicemail feature of the subscriber rules. Once the feature is activated, all incoming calls are automatically forwarded to the subscriber's voice mailbox. In other words, wireless device 110 does not ring as long as it remains within the delineated boundaries of courthouse 308. If a voicemail was left in the voice mailbox while the subscriber was in courthouse 308, then as soon as he leaves courthouse 308, he is alerted to the voicemail message by feature server 102 through a ringing tone (or a vibration signal) from wireless device 110.

When the subscriber enters the delineated boundaries of theater 308, another service feature is activated. This time, the subscriber is alerted to an incoming call by the vibrator feature of wireless device 110 instead of the ringer feature. Through a display on wireless device 110, the subscriber is given a list of call management options outlining what he could do with the incoming call. For example, the subscriber is asked to select one option from the choices of "Answer," "Hold," "Reject," "Voice Mail," and "Forward to Office." If the subscriber decides to accept the call but at a few seconds later, he can simple choose "Hold," and the caller will hear a recorded voice of the subscriber, e.g., "I'm in the theater, please wait for a few more seconds as I find my way to a place where I can talk." The subscriber then excuses himself, finds a convenient place to talk, and presses another key on wireless device 110 so that he could start talking with the caller. Alternatively, if the subscriber does not want to take the call, he could choose one of the remaining options. As soon as the subscriber leaves theater 310, the default rule is in operation again unless the subscriber in a location that is defined by the subscriber rules.

Figure 6:
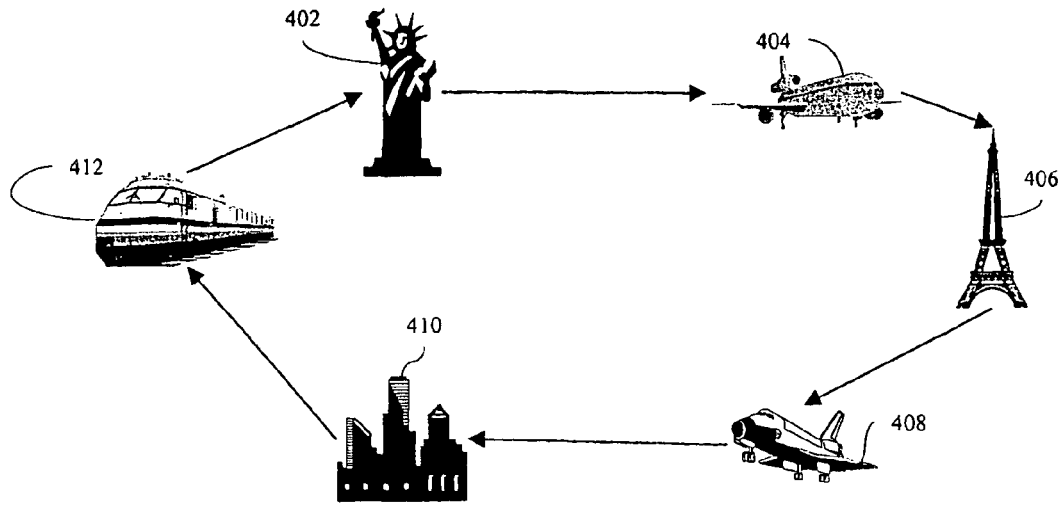
FIG. 6 is a schematic diagram illustrating a specific example of a subscriber using a second specific embodiment of the present invention in areas served by more than one wireless communication network.

FIG. 6 is a schematic diagram illustrating a specific example of using a second specific embodiment of the present invention by a subscriber whose traveling covers areas served by more than one wireless communication network. In this example, the subscriber lives and works in home city 402 where she is a customer of a wireless service provider. She travels occasionally to foreign city 406 for vacation. She visits domestic city 410 regularly to conduct business. The wireless service provider has roaming agreements with other wireless service providers in domestic city 410 and foreign city 406. As a result, the subscriber may use her wireless device 110 in home city 402, domestic city 410, and foreign city 406. Airplanes 404 and 408 and train 412 are vehicles that transport the subscriber from a city to another city. In this embodiment, the subscriber rules are established based on the subscriber's habits for using wireless device 110. In this example, wireless device 110 may be a wireless telephone. The location system can be a handheld unit such as handheld location system 112 shown in FIG. 2. Furthermore, feature server 102 and memory 104 can be part of wireless device 110 as shown in FIG. 2. Again, the system architecture shown in FIG. 1 may also be used.

Figure 7:
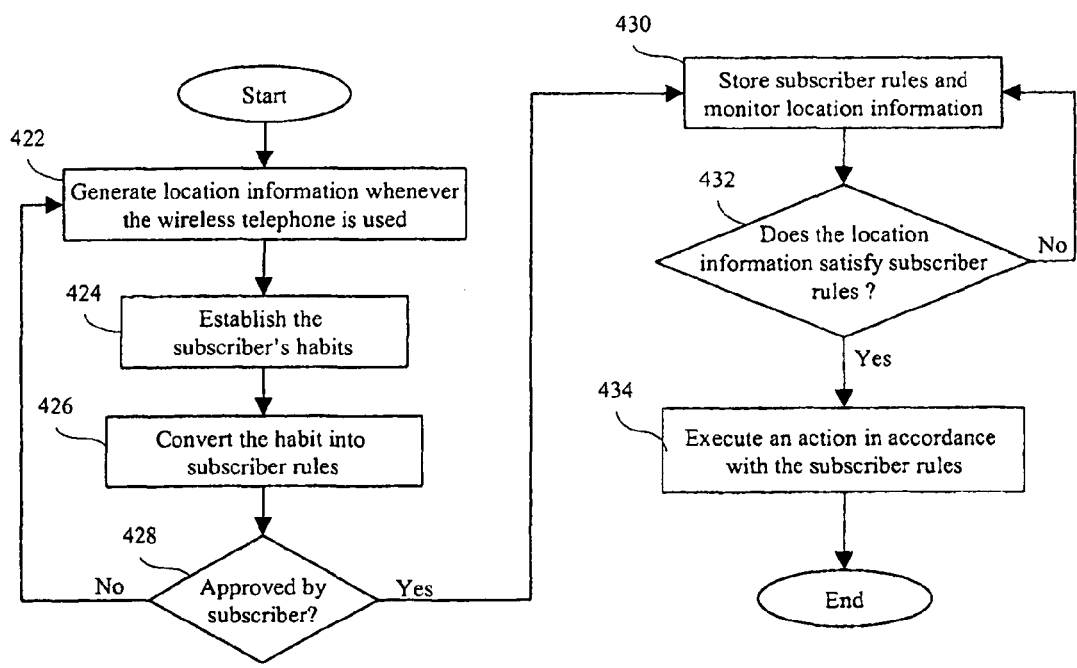
FIG. 7 is a flowchart illustrating the steps involved in using the second specific embodiment shown in FIG. 6.

FIG. 7 is a flowchart illustrating the steps involved in using the second specific embodiment shown in FIG. 6. In step 422, the location system can generate location information pinpointing the location of wireless device 110 whenever wireless device 110 is used. The location information and the habits of the subscriber for using wireless device 110 can be stored, for example, in memory 104 that is in communication with feature server 102. For example, feature server 102 can record in memory 104 frequently dialed telephone numbers and relates those frequently dialed numbers with the location information and the time at which the calls were made.

In step 424, after feature server 102 has built up substantial experience with the subscriber's movements and habits, e.g., two months, the subscriber's habits for using wireless device 110 can be reduced to a finite number of repeated circumstances. In step 426, feature server 102 can convert the habits into subscriber rules. In a specific example, the subscriber rules may contain the following call routing instructions and user preferences:

(1) When wireless device 110 is in home city 402, accept all incoming calls.
(2) When wireless device 110 is in foreign city 406 where wireless device 110 was never used in the last two months, an incoming call is forwarded to his voice mailbox and an announcement: "I'm out of town, please leave a message," is played as a greeting.
(3) When wireless device 110 is in domestic city 410 where he uses wireless device 110 to accept calls from a selected list of callers, only incoming calls from those callers are acceptable. All other incoming calls are forwarded to his voice mailbox.
(4) When wireless device 110 is in an airport, notify the subscriber that he is in the airport, and wireless device 110 will be turned off in thirty minutes unless he overrides it or specify a time at which to turn off wireless device 110.
(5) When wireless device 110 is approaching home city 402 on train 412 and train 412 is about 20 minutes away from a train station in home city 402, call a driver to pick up the subscriber.

In step 428, the subscriber rules can be presented to the subscriber for her approval. The subscriber rules may be displayed on the mini-browser on wireless device 110 or they may be played as voice recording. If the subscriber does not approve the subscriber rules, the process return to step 422. If the subscriber rules are modified or otherwise approved by the subscriber, the process goes to step 430.

Referring to FIG. 6 and assuming the subscriber is going through the following journey: arriving at a first airport in home city 402; flying on airplane 404; arriving at a second airport; staying in foreign city 406, leaving the second airport; flying on airplane 408; arriving at a third airport; staying in domestic city 410; riding on train 412; and arriving at a train station in home city 402. Steps 430 through 434 of FIGS. 7 may be described as follows.

In step 430, location system 112 can generate the location information at regular intervals, e.g., every five minutes. When the subscriber and wireless device 110 arrives at the first airport in home city 402 and generate the location information there, feature server 102 can recognize the location information as a triggering event, i.e., wireless device 110 is in an airport that is identified in the subscriber rules. In step 432, feature server 102 can review the subscriber rules, and determine that the appropriate action is to alert the subscriber that she is in the airport. In step 434, feature server 102 can ring wireless device 110, and display the message: "You are now at the airport. This telephone will be powered off in thirty minutes unless you enter a number greater than 30." Suppose the departure time is 60 minutes away from the time the message is displayed, and the subscriber wants to wait for an incoming call, the subscriber may use the keypad to enter "60," delaying the auto power off feature from 30 minutes to 60 minutes. When the 60 minutes duration expires, feature server 102 can power off wireless device 110. This feature prevents the subscriber from forgetting to power off her wireless device 110 when she enters airplane 404.

Steps 430 through 434 are then repeated as the subscriber continues her journey. When the subscriber powers on wireless device 110 in foreign city 406, location system 112 can generate new location information in step 430. When feature server 102 receives the new location information, it knows, based on the subscriber rules, that wireless device 110 is in a city where the subscriber does not accept incoming calls. Therefore, although the subscriber may use wireless device 110 to make outgoing calls, all incoming calls will be forwarded to her voice mailbox, thereby saving her roaming fees for answering the incoming calls. If a call is made by a caller to wireless device 110, feature server 102, in step 434, can play the announcement to the caller "I'm out of town, please leave a message."

As the subscriber continues her journey from foreign city 406 to domestic city 410 using airplane 408, similar steps are repeated. For example, the subscriber is reminded about the auto power off feature when she is in the second and third airports.

When the subscriber arrives in domestic city 410 that she visits frequently, feature server 102, in step 432, can review location information generated by location system 112 in step 430, and accepts incoming calls from designated callers in accordance with the subscriber rules in step 434.

When the subscriber is on train 412, location system 112 can continue to generate location information, and feature server 102 can continue to review the location information. As soon as the train is estimated to arrive at the train station in home city 402, feature server 102 can make a call to a taxi service. This feature is done even if the subscriber is sleeping. The taxi service would hear a voice recording, "This is Ms. Smith. I am 20 minutes away from the train station. Please come to pick me up."

In addition to determining a time to call a taxi service, a software component may be able to use location information about individual taxis and select a taxi company based on which company's taxis are closest to the train station. Taxi locations may be provided using location information provided by wireless phones in the taxis, or using some other source of location information, such as any wireless transmitter attached to the vehicle. Based on a particular taxi or set of taxis being closest to the subscriber's eventual location, a software component may make the phone call to the taxi company having the closest taxis. Moreover, such a method of selecting a taxi company need not be limited to a subscriber's impending arrival at a train station.

Similar technology may be used when the subscriber is traveling along a highway in a car and is looking for a taxi service at her point of egress from the vehicle in which she is currently traveling. If the subscriber provides to a software component an expected time of arrival at her destination (e.g., about one hour), then the software component may determine a likely point of egress using the subscribers position and speed (and optionally knowledge of roads and highways) and then determine which taxis and taxi companies are closest to the point of egress. Furthermore, in having a software component request a taxi on her behalf, the subscriber may enter additional parameters (or previously have set preferences) further limiting a choice of taxi company. For example, the subscriber may have previously specified a particular taxi company or multiple companies with which she would prefer to work. Additionally, the subscriber may also specify that the driver speak a particular language. Such a preference may be used to request a specific taxi at a specific taxi company, or it may simply be communicated to the selected taxi company as a preference.

Figure 8:
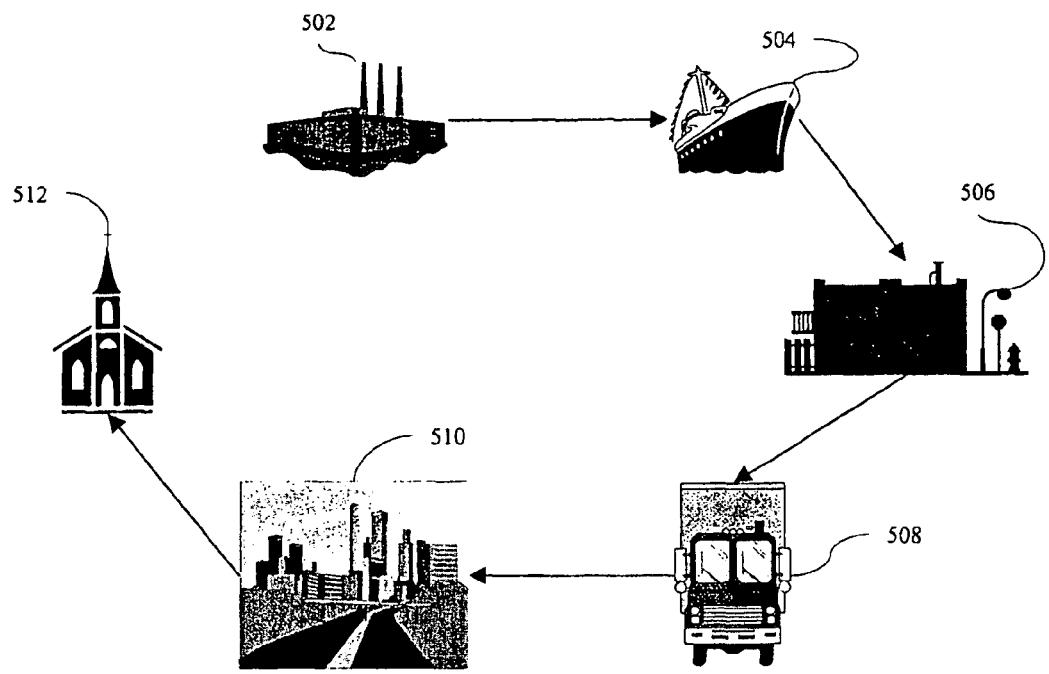
FIG. 8 is a schematic diagram illustrating a specific example of using a third specific embodiment of the present invention to track the delivery of a package.

FIG. 8 is a schematic diagram illustrating a specific example of using a third specific embodiment of the present invention to track the delivery of a piano from factory 502 to church 512 in city 510. Along the delivery route, the piano will be shipped using vessel 504, stored in warehouse 506, and delivered by truck 508. In this embodiment, a handheld location system, such as location systems 112 shown in FIG. 2 can provisioned on wireless device 110. Wireless device 110 in this embodiment may be an electronic transmitter. The preferred location system 112 in this embodiment is a GPS receiver. Wireless device 110 can be easily attached to the piano. Location system 112 is in communication with a feature server, such as feature server 102 shown in either FIG. 1 or FIG. 2. Feature server 102 may be part of wireless device 110 or it may be residing at a local area network of the subscriber. In this example, the subscriber is the delivery company. As part of its delivery services, the subscriber provides its customer with a service of the present invention through which the piano manufacturer and the piano purchaser may specify before the delivery begin how they would like to be informed of the delivery status.

Figure 9:
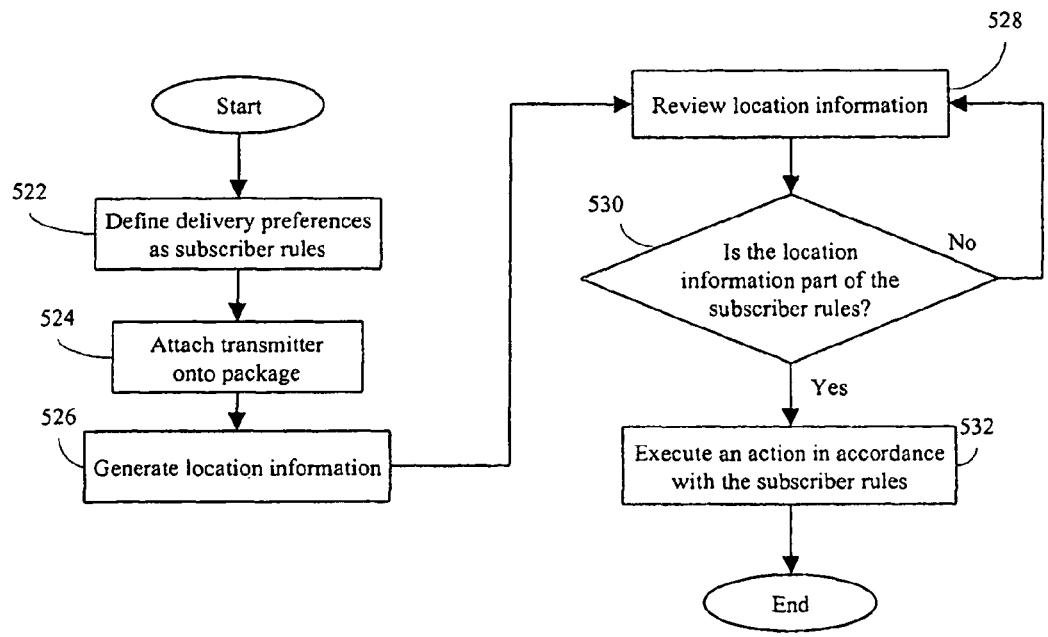
FIG. 9 is a flowchart illustrating the steps involved in using the third specific embodiment shown in FIG. 8.

FIG. 9 is a flowchart illustrating the steps involved in using the third specific embodiment shown in FIG. 8. In step 522, delivery notification preferences (the subscriber rules) can be defined. The subscriber rules may contain inputs from the delivery company, the piano manufacturer, and the piano purchaser. The subscriber rules can be stored in a memory, such as memory 104 shown in FIGS. 1 and 2. Specific examples of the subscriber rules may include the following:

(1) When wireless device 110 is attached to the piano that is ready for delivery in factory 502, notify the piano purchaser that the piano has been packaged and is ready for delivery.

(2) While vessel 504 is carrying the piano, monitor the speed of the vessel, and periodically inform the subscriber of its status with an estimated time of arrival.

(3) When the piano is stored in warehouse 506, dispatch truck 508 to pick up the piano.

(4) While truck 508 is carrying the piano, periodically calculate the estimated time of arrival by monitoring the speed at which the truck is moving and the distance traveled.

(5) When truck 508 enters the city limits of city 510 where church 512 is located, notify the piano purchaser about the pending arrival.

(6) When the piano is delivered to the piano purchaser and wireless device 110 is detached, print a log documenting the delivery for the piano manufacture and the delivery company.

Once these delivery preferences or subscriber rules are defined, they can be programmed into feature server 102 and memory 104. In step 524, wireless device 110 can be attached to the piano and activated.

Once activated, location system 112 can generate location information in step 526. The location information may be generated continuously or at regular intervals, and the location information can be provided to feature server 102. In other embodiments, the location information may be generated at specific times as programmed in the subscriber rules. In step 528, feature server 102 can review the location information. If in step 530 feature server 102 receives location information that is defined in the subscriber rule, e.g., the piano is now somewhere in the Pacific Ocean on vessel 504, feature server 102 can execute an action in step 532. In these instances, the appropriate action is to review the location information and the speed at which the vessel is traveling, and estimated an arrival time. The appropriate action may further include sending a message to the headquarters of the subscriber informing the subscriber of the status of the status of the delivery. Steps 528 through 532 are repeated as the piano makes its way to the piano purchaser.

For example, when the piano is stored in warehouse 506, feature server 102 can execute another action. This time it may notify the subscriber that the piano has arrived in warehouse 506, and the subscriber can dispatch a truck to pick up the piano. When the piano is being carried by truck 508, location system 112 can continue to generate location information and feature server 102 can continue to monitor the location of the piano and estimate the time of arrival. As soon as truck 508 enters the city limits of city 510, feature server 102 can send a message to the piano purchaser. The message may be a voice recording stating: "The piano you ordered has entered the city limits. It should be arriving at the church momentarily." Once the piano purchaser accepts the piano, wireless device 110 can be removed. A log of the delivery can then printed at the headquarters. The log may then be given to the piano manufacturer for its files.

Figure 10:
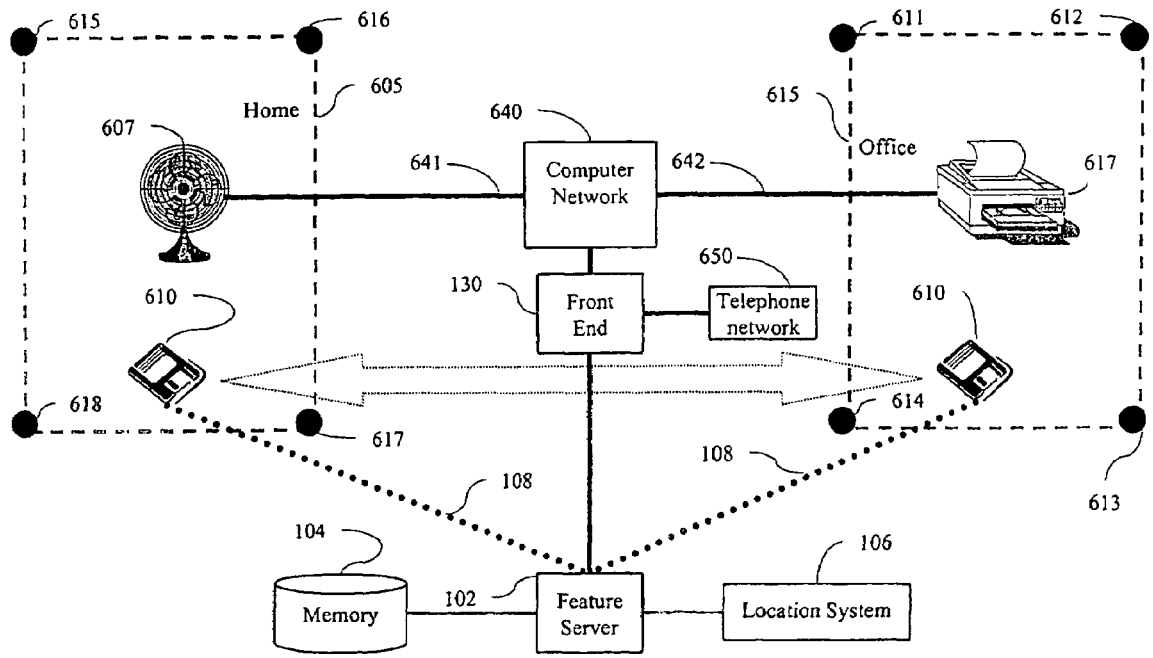
FIG. 10 is a schematic diagram illustrating a specific example of using a fourth specific embodiment of the present invention to remotely operate various office equipment and home appliances controlled by one or more computer networks.

FIG. 10 is a schematic diagram illustrating a specific example of using a fourth specific embodiment of the present invention by a fourth subscriber to activate a machine such as an office equipment and a home appliance controlled by one or more computer networks. In this embodiment, wireless device 110 of the present invention may be handheld computer 610. Appliance 607 and equipment 617 are located in home 605 and office 615, respectively. Feature server 102 is in communication with handheld computer 610 and front end 130. Although shown as separate components, feature server 102, memory 104, and location system 106 may be integrated into handheld computer 610. Front end 130 is in communication with one or more computer networks 640 and at least one telephone network 650. Home 605 is delineated by nodes 615, 616, 617, and 618. Office 615 is delineated by nodes 611, 612, 613, and 614. Communication link 641 connects appliance 607 to computer network 640, and communication link 642 connects equipment 617 to computer network 640. Computer network 640 may be a local area network. Computer network 640 may also be the global computer network known as the Internet. Feature server 102, memory 104, and location systems 106 and 112 communicate with handheld computer 610 via communication link 108. Each of feature server 102, memory 104, and location system 106 is preferably provisioned at handheld computer 610.

Figure 11:
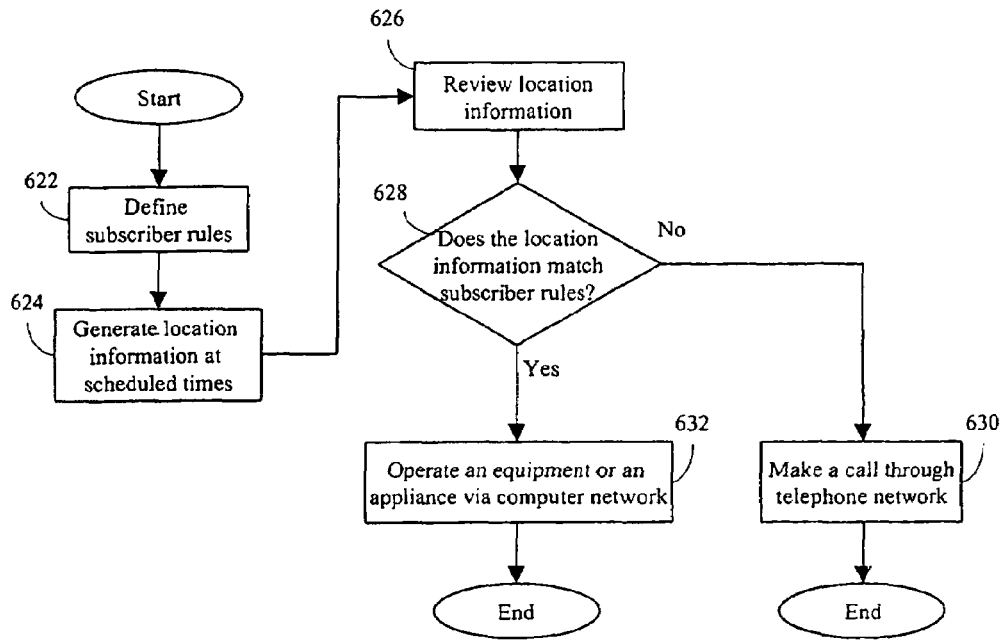
FIG. 11 is a flowchart illustrating the steps involved in using the fourth specific embodiment shown in FIG. 10.

FIG. 11 is a flowchart illustrating the steps involved in using the fourth specific embodiment shown in FIG. 10. In this embodiment, the subscriber can define subscriber rules through an input device on handheld computer 610 in step 622. The subscriber rules may include a provision that activates the location system in step 624 to generate location information pinpointing the location of handheld computer 610 at specific times. For example, feature server 102 can be programmed with subscriber rules such that location system 106 can generate location information at 8:55 a.m. and 5:55 p.m. on Mondays through Fridays. Location system 106 can be otherwise inactive. The subscriber rules in this specific example may include the following:

(1) Generate location information at 8:55 a.m. on Mondays through Fridays. If handheld computer 610 is more than ten minutes away from office 615, call someone in office 615 to inform him that the subscriber is more than ten minutes away from office 615. Otherwise, turn on equipment 617 via computer network 640.

(2) Generate location information at 5:55 p.m. on Mondays through Fridays. If handheld computer 610 is more than 30 minutes from home 605, call someone at home 605. Otherwise, turn on appliance 607 via computer network 640.

At 8:55 a.m. on a Monday, location system 106 can generate the first location information in step 624. In step 626, feature server 102 can review the location information. If in step 628 it is determined that handheld computer 610 is still more than ten minutes away from office 615, feature server 102, in step 630, can make a call to a wireline telephone in office 615 through telephone network 650 to let someone know that the subscriber is more than ten minutes away from office 615. Otherwise, if in step 628 it was determined that the subscriber is fewer than ten minutes away from office 615, then feature server 102 in step 632 sends a message to computer network 640 to turn on equipment 617.

Similarly, at 5:55 p.m., location system 106 can generate a second location information in step 624. In step 626, feature server 102 can review the location information. If in step 628 it is determined that the subscriber is not within 30 minutes from home 605, feature server 102 can make a call, in step 630, through telephone network 650 to a wireline telephone at home 605 that the subscriber is more than 30 minutes away from home 605. Otherwise, feature server 102 can activate appliance 607 in step 632 via computer network 640.

Figure 12:
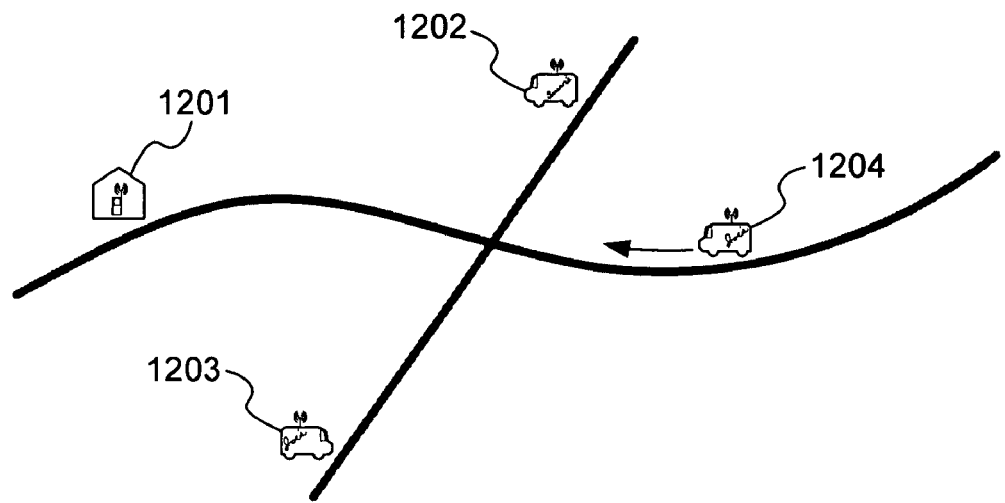
FIG. 12 is a geographic representation of an example of requesting a service such as a plumber using location information.

FIG. 12 is a geographic representation of an example of requesting a service such as a plumber using location information. User 1201 is a homeowner who requires the services of a plumber to fix a problem. Plumbers 1202, 1203, and 1204 are all prospective plumbers who may fit the bill for user 1201. A software component may receive from user 1201 a request for a provider of plumbing services, the component located on a wireless device located at the home of user 1201 or on a remote server (not shown). The software component may be co-located with a feature server. User 1201 may access the software component through a number of technologies, including a web browser on a computer, an interface on a wireless device (e.g., cellular telephone, personal digital assistant, computer with wireless network connection, etc.), an interactive voice response system, through an intermediary such as a telephone operator, and other methods of access. Concurrent with the user's request, location information is provided to the software component, as described above. Using this information, the software component can select a service provider (i.e. a plumber) who is geographically available to user 1201. This selection may include using location information associated with plumbers 1202, 1203, and 1204 by way of wireless devices associated with each. Location information may further be manually be provided by a dispatcher or other person having knowledge of plumber locations.

In the example of FIG. 12, using location, plumber 1203 may be the selection of the software component. Plumber 1203 is closest to user 1201 as the crow flies. However, the software component may have knowledge of roads and highways, and be able convert the locations of plumbers 1202, 1203, and 1204 into road locations. In this situation, plumber 1202 may be selected, as this plumber is closer via known roads. In addition, the software component may be able to receive subsequent locations from plumbers 1202, 1203, and 1204, which may be used to estimate a speed and direction for each plumber. Having this information, the software component may determine that plumbers 1202 and 1203 are stationary, but plumber 1204 is moving towards user 1201. Knowing this, the software component may select plumber 1204 since the plumber may get to user 1201 the fastest.

Concurrent with user 1201's request, one or more additional service-specific parameters may be provided that further limit selectable service providers. These parameters may be provided by the user at the time he or she makes the request, or they may have been previously specified by the user or software component and stored for all such requests. These service-specific parameters may include any of the following:

1) Specific time needed or fastest time available.
2) Price range.
3) Payment method offered.
4) Language spoken.
5) Rating by a reviewer of the service.
6) Whether the provider is insured.

7) Whether a pre-existing relationship exists with the provider.
8) Whether the provider has a particular specialty.
9) Whether the provider offers a guarantee or warranty.
10) Whether the provider has a specific certification.

When evaluating plumbers, the software component may utilize service-specific parameters such as these to make a selection. The parameters associated with the request may be prioritized or weighted for importance to the user. The software component may select a plumber based on meeting the one or more parameters specified in conjunction with evaluating the locations of each plumber relative to user 1201.

The method of selection described above may also be utilized when a user requires other types of services. In addition to plumbing services, other types of home repair services may be requested. Furthermore, livery services such as a taxi company may be requested using similar wireless technology and service-specific parameters. Additional parameters that may be available when requesting livery services include time to destination and type of vehicle (e.g., limousine or mini-van).

Once a plumber is selected, an action is executed by the software component. It may simply respond to user 1201 with the name of the selected plumber or plumbers, and other relevant information. In addition, software component may be authorized to act on behalf of the user and to communicate with the selected plumber. This may be accomplished via a textual format (e.g., a web page, email, SMS messaging, facsimile, etc.), or using an voice response system. For example, plumber 1204 may be sent a text message via an associated wireless device and/or plumber 1204 may receive a voice call stating something like, "User needs your services within the next 45 minutes. User resides at 1313 Mockingbird Lane. Please press 1 if you will be there within 45 minutes, 2 if it will take longer than 45 minutes, or 3 if you are unable to respond." Once plumber 1204 responds, the software component may provider user 1201 a status via the same interface used to make an initial request.

A software component may further provide a facility for ongoing negotiations with one or more service providers once an action has been executed. Such a facility may minimally include an online chat room, conference call, or email facility for sharing offers and counteroffers. Once a negotiated service agreement is established, the negotiation facility may store the agreement for future reference.

Figure 13:
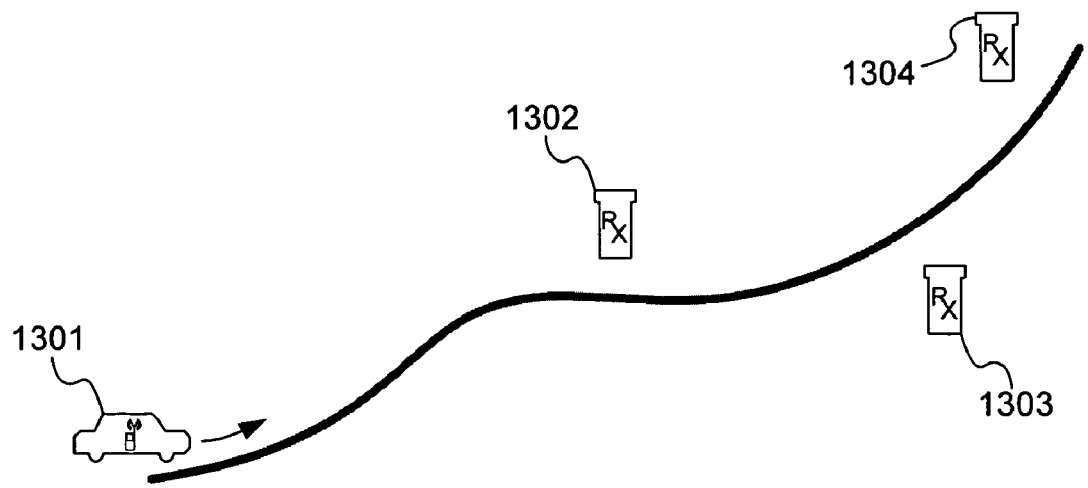
FIG. 13 is a geographic representation of an example of requesting a service such as a pharmacy using location information.

FIG. 13 is a geographic representation of an example of requesting a service such as a pharmacy using location information. Similar to the example of FIG. 12, here, location information is utilized by a software component to aid in the selection of a service provider. Here, the service is a pharmacy. If user 1301 requests pharmacy services, the software component may select one of pharmacies 1302, 1303, and 1304 based on location and other service-specific parameters.

One primary difference between user 1201 and user 1301 is that user 1301 is moving in a vehicle. By receiving subsequent locations from the wireless device associated with user 1301, the software component may estimate a speed and direction of the user. Used in conjunction with knowledge of roads and highways, the software component may be able to predict where the user will be at a particular time. Used in conjunction with service-specific parameters, the software component may modify its selection of a pharmacy using this dynamic location information.

Service-specific parameters which may be associated with a request for pharmacy services include, but are not limited to, many of the parameters listed above and:
1) Product availability (e.g., amoxicillin).
2) Whether product can be delivered.
3) Time to fill a prescription.
4) Hours of operation.

Using service-specific parameters and known locations of user 1301 and pharmacies 1302, 1303, and 1304, the software component can select a pharmacy. Here, user 1301 is moving in the direction of three pharmacies 1302, 1303, and 1304. The software component may determine an estimated time of arrival at each pharmacy. When user 1301 requests a specific product, pharmacy requests may be sent to each of pharmacies 1302, 1303, and 1304. The pharmacy requests may ask for specific product availability and a time to fill the prescription. Other parameters such as price, payment method, etc. may be included in the pharmacy request, or may already be known to the software component. Pharmacy 1302 may not have the requested product, leaving pharmacies 1303 and 1304. Both may have the product, but pharmacy 1304 may take 30 minutes longer to fill the prescription. Pharmacy 1303 may be the best or only choice based on location and the service-specific parameters requested by the user.

By determining when user 1301 will arrive at each pharmacy and knowing how long it will take each pharmacy to fill the prescription, the software component can select pharmacy 1303, and execute an action, such as placing an order to be filled on behalf of the user. Alternatively, the software component may connect the user directly with the pharmacy so that user 1301 can place the order manually, and possibly ask additional questions.

Such a service selection may also be utilized in the context of other services. For example, a user may need a particular medical service, and the software component can select and make an appointment for the user. Service-specific parameters in this setting may include many of the above-identified parameters, as well as medical specialty, appointment availability, and whether the provider takes the user's insurance.

Figure 14:
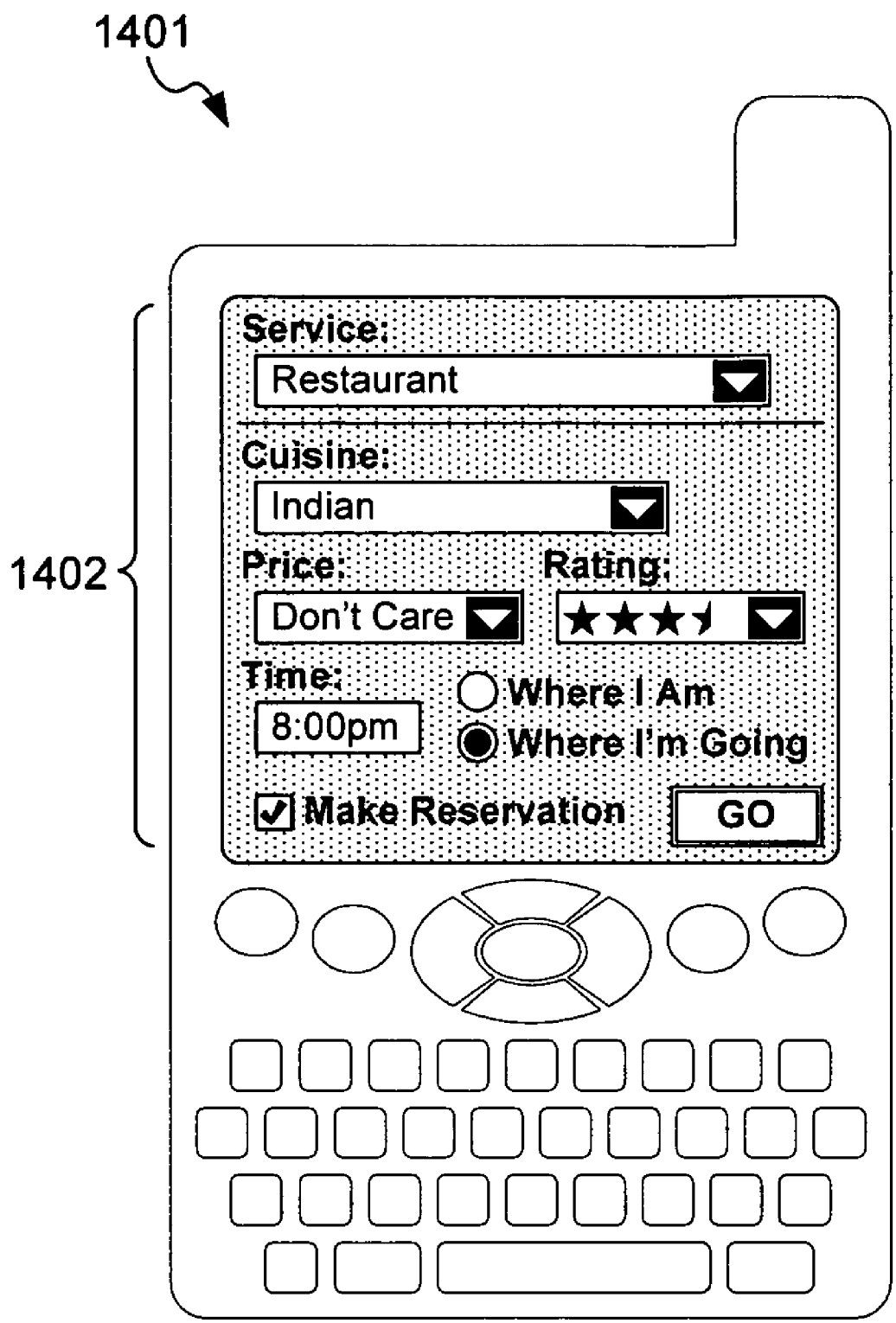
FIG. 14 is a depiction of an interface example through which a user may provide service-specific parameters.

FIG. 14 is a depiction of an interface example through which a user may provide service-specific parameters. Here, wireless device 1401 is able to access an interface 1402 for requesting services from a software component. Wireless device 1401 can both provide access to the software component and location information corresponding to a request for services. However, an access interface and wireless location provider need not be contained within the same device. For example, a cell phone may provide location information and a web page on a separate computer may provide access to the software component.

Interface 1402 includes an entry area for the type of service being requested by the user. Here, a user is searching for a restaurant and has selected that type of service. Service-specific parameters then appear which may further narrow the focus of the selection. Interface 1402 includes service-specific parameters such as:
1) Type of cuisine.
2) Price range.
3) Minimum rating.
4) Desired time of seating.
5) Whether the location is the present location, or another location.
6) Whether a reservation should be made, if available.

Other parameters not shown on interface 1402 may include many of those listed above as well as recommended attire, delivery charge, specific neighborhood, etc. When requesting this information via a software component, the location information provided by wireless device 1401 is used in conjunction with the supplied parameters when selecting a restaurant. If a user chooses the "Where I'm Going" option, the software component may estimate a speed and direction of the user based on multiple locations received over time, and then utilize the desired time of seating to predict where the user will be at the appointed time. If the software component is not sure where the user is going (e.g., locations are changing too much over time to predict future location), the software component may request additional information from the user (e.g., desired neighborhood or zip code).

Figure 15:
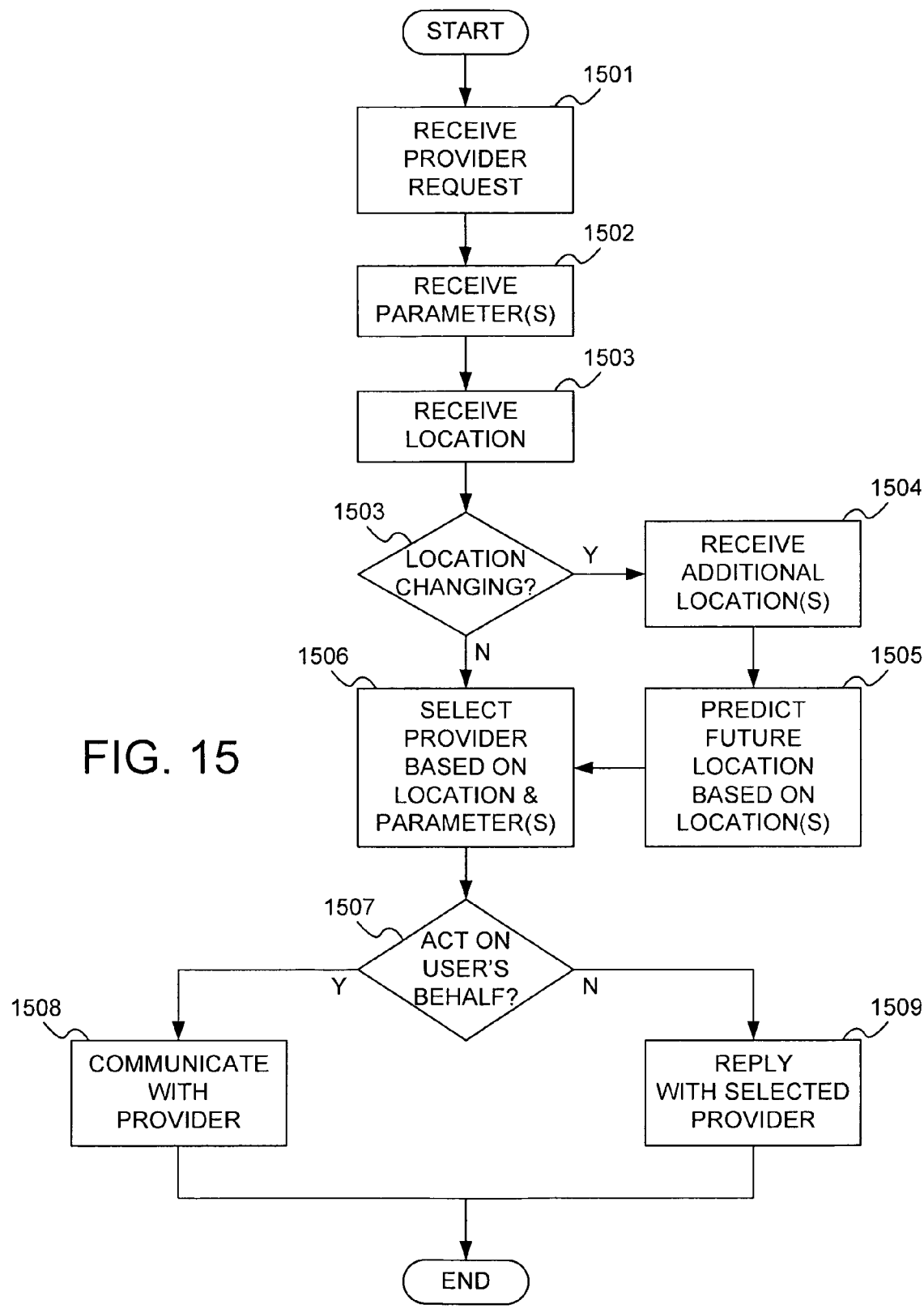
FIG. 15 is a flowchart illustrating steps involved in using location information to execute an action in response to a request.

FIG. 15 is a flowchart illustrating steps involved in using location information to execute an action in response to a request. Steps displayed are merely representative. Steps may be added, removed, rearranged, and so forth. At step 1501, a request for a provider of a service is received, accompanied by one or more service-specific parameters at step 1502, and location information at step 1503. If the location is changing at decision 1503, then at step 1504, additional locations may be received in order to predict future locations based on the changes in location at step 1505. At step 1506, one or more providers of a service are selected using the location information in conjunction with other service-specific parameters. At decision 1507, depending on whether a software component is authorized and/or able to act on behalf of the user, at step 1508, communication with a selected service provider is initiated, or at step 1507 a reply is sent to the user with identifying information about selected provider(s).

On occasion, a user may not even know which service to request. For example, when confronting a home repair, a user may not know which type of repair person to request. As another example, a user may not know what type of medical specialty to request when confronted with an illness. In these situations, an interface may prompt the user for additional information in order to aid the user in selecting a service to request. Such service selection tools may be implemented for any family of services.

The foregoing disclosure of embodiments and specific examples of the present invention have been presented for purposes of illustration and description. It is not intended to be exhaustive or to limit the invention to the precise forms disclosed. Many variations and modifications, including additional services having service-specific parameters, will be obvious to one of ordinary skill in the art in light of the above disclosure. Additional services and their respective service-specific parameters may include those found in the advertisements and listings of a business directory. Examples of such a directory include volumes A-L and M-Z of the 2005 BellSouth Greater Atlanta Real Yellow Pages, both having been previously incorporated by reference. The scope of the invention is to be defined only by the claims appended hereto, and by their equivalents.

I claim:

1. A computer-implemented method for executing an action based on location information, the method comprising:
   receiving a request for a provider of a specified service from a user;
   receiving from the user a first service-specific parameter for the specified service;
   receiving from a first wireless device a first location associated with the user;
   selecting the provider of the specified service, wherein selecting the provider includes evaluating a plurality of providers based on both the first location and the first service-specific parameter; and
   executing the action based on the selected provider.

2. The computer-implemented method of claim 1, wherein the first wireless device comprises a wireless phone.

3. The computer-implemented method of claim 1, wherein executing the action based on the determined provider comprises replying to the request with an identifier of the provider.

4. The computer-implemented method of claim 1, wherein executing the action based on the determined provider comprises putting the user in communication with the provider.

5. The computer-implemented method of claim 1, wherein executing the action based on the determined provider comprises communicating with the provider on behalf of the user.

6. The computer-implemented method of claim 4, further comprising:
   receiving a response from the provider; and
   communicating the response to the user.

7. The computer-implemented method of claim 5, further comprising:
   providing a facility for ongoing communication between the user and the provider.

8. The computer-implemented method of claim 7, wherein the facility for ongoing communication between the user and the provider further enables negotiation of terms between the user and the provider.

9. The computer-implemented method of claim 1, further comprising:
   receiving a first plurality of locations from a plurality of wireless devices associated with a plurality of providers of the specified service; and
   selecting the provider from among the plurality of providers of the specified service using a comparison of the first plurality of locations relative to the first location.

10. The computer-implemented method of claim 9, further comprising:
    receiving a second plurality of locations from the plurality of wireless devices associated with the plurality of providers; and
    selecting the provider of the specified service based on a plurality of predicted future locations, wherein the plurality of predicted future locations are determined using both the first and second pluralities of locations.

11. The computer-implemented method of claim 1, further comprising:
    receiving from the first wireless device a second location, wherein the second location differs from the first location; and
    selecting the provider of the specified service based on a predicted future location, wherein the predicted future location is determined using both the first and second locations.

12. The computer-implemented method of claim 1, wherein the specified service is one of livery services, home repair services, medical services, and pharmacy services.

13. The computer-implemented method of claim 1, wherein the service-specific parameter includes one of time to service, price range, hours of operation, payment method, language spoken, rating, pre-existing relationship, and insurance.

14. A system for executing an action based on location information, the system comprising:
- a first wireless device associated with a user, the wireless device characterized by a first location; and
- a computer, in communication with the first wireless device, with the user, and also with a provider of a service, the computer storing instructions for executing the action, the instructions including:
  - receiving a request for the service from the user,
  - receiving the first location from the first wireless device,
  - receiving a second location from the provider,
  - determining whether the second location is sufficiently close to the first location, and
  - executing the action responsive to the first and second locations being sufficiently close.

15. The system of claim 14, wherein the computer stores further instructions including:
- receiving one or more additional parameters about the service from the user,
- determining whether the provider meets the one or more additional parameters about the service, and
- executing the action responsive to the provider meeting the one or more additional parameters about the service and responsive to the first and second locations being sufficiently close.

16. The system of claim 15, wherein the action comprises contacting the provider to request a service on behalf of the user.

17. The system of claim 15, wherein the computer stores further instructions including:
- receiving a response from the provider; and
- communicating the response to the user.

18. The system of claim 15, wherein the action comprises replying to the request with identifying information of the provider.

* * * * *